(12) United States Patent
Österling

(10) Patent No.: US 11,552,692 B2
(45) Date of Patent: *Jan. 10, 2023

(54) OPERATING A LOWER LAYER SPLIT CENTRAL UNIT

(71) Applicant: Telefonaktiebolaget LM Ericsson (publ), Stockholm (SE)

(72) Inventor: Jacob Österling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/298,084

(22) PCT Filed: Nov. 26, 2019

(86) PCT No.: PCT/IB2019/060194
§ 371 (c)(1),
(2) Date: May 28, 2021

(87) PCT Pub. No.: WO2020/110004
PCT Pub. Date: Jun. 4, 2020

(65) Prior Publication Data
US 2022/0021435 A1    Jan. 20, 2022

Related U.S. Application Data

(60) Provisional application No. 62/773,380, filed on Nov. 30, 2018.

(51) Int. Cl.
*H04B 7/06* (2006.01)
*H04L 5/00* (2006.01)
*H04W 72/12* (2009.01)

(52) U.S. Cl.
CPC ......... *H04B 7/0695* (2013.01); *H04L 5/0023* (2013.01); *H04L 5/0044* (2013.01);
(Continued)

(58) Field of Classification Search
CPC ... H04B 7/0695; H04L 5/0023; H04L 5/0044; H04L 5/0094; H04L 5/0048; H04W 72/1289

See application file for complete search history.

(56) References Cited

U.S. PATENT DOCUMENTS 11,109,383 B2 *  8/2021  Seo ........................... H04L 5/00
2018/0241448 A1 * 8/2018  Oketani ............ H04W 28/0263
(Continued)

FOREIGN PATENT DOCUMENTS

EP      3346747 A1      7/2018

OTHER PUBLICATIONS

International Search Report and Written Opinion of the International Searching Authority, PCT/IB2019/060194, dated Feb. 11, 2019, 10 pages.

(Continued)

*Primary Examiner* — Sophia Vlahos
(74) *Attorney, Agent, or Firm* — Sage Patent Group

(57) ABSTRACT

A method of operating an LLS-CU includes providing downlink signals to be transmitted to a UE over a wireless radio interface, allocating the downlink signals to resource elements, REs, of a physical downlink channel, generating a data-associated control information, DACI, message including a section description associated with the downlink signals, the DACI message including a resource element mask that defines the location of one or more REs within a PRB of a downlink signal on the physical downlink channel, and an indication of beamforming weights to be applied by a radio unit, RU, when transmitting the downlink signals to the UE, wherein the beamforming weights are associated with resource elements according to the resource element
(Continued)

mask, transmitting the DACI message to the RU, and transmitting the downlink signals to the RU for transmission to the UE.

16 Claims, 25 Drawing Sheets

(52) U.S. Cl.
 CPC ....... *H04L 5/0094* (2013.01); *H04W 72/1289* (2013.01); *H04L 5/0048* (2013.01)

(56) References Cited

U.S. PATENT DOCUMENTS

| | | | |
|---|---|---|---|
| 2019/0223169 A1* | 7/2019 | Ren | H04B 7/0619 |
| 2020/0195312 A1* | 6/2020 | Wu | H04W 72/1273 |
| 2022/0123812 A1* | 4/2022 | Österling | H04W 72/042 |
| 2022/0166585 A9* | 5/2022 | Rajagopal | H04W 72/042 |

OTHER PUBLICATIONS

XRAN, XRAN-FH.CUS.0-v01.00, Technical Specification, xRAN Fronthaul Working Group, Control, User and Synchronization Plane Specification, Apr. 4, 2018, 61 pages.
NTT Docomo, Inc., 3GPP TSG RAN WG3 Meeting #97, R3-173297 (update of R3-172583), Evaluation criteria for lower layer split, Berlin, Germany, Aug. 21-25, 2017, 6 pages.
3GPP TR 23.724 v1.0.0 (Sep. 2018), 3$^{rd}$ Generation Partnership Project; Technical Specification Group Services and System Aspects; Study on Cellular IoT support and evolution for the 5G System (Release 16), 234 pages.
XRAN, xRAN Fronthaul Working Group; Control, User and Synchronization Plane Specification, XRAN-FH.CUS.0-v02.00, 2018, 156 pages.

* cited by examiner

Downlink PRB Example

FIG. 10A

| Section Description | Section Extension |
|---|---|
| PRB7 | RE Mask 1<br>BFW1<br><br>BFW0 |
| PRB6 | |
| PRB5 | |
| PRB4 | |
| PRB3 | |
| PRB2 | |
| PRB1 | |
| PRB0 | |

FIG. 10B

| Section Description | Section Extension |
|---|---|
| PRB7 | RE Mask 2<br>BFW2<br><br>BFW0-2 |
| PRB6 | |
| PRB5 | |
| PRB4 | |
| PRB3 | RE Mask 1<br>BFW1<br><br>BFW0-1 |
| PRB2 | |
| PRB1 | |
| PRB0 | |

| Section Description | Section Extension | |
|---|---|---|
| PRB7 | ΔBFW1-7 | RE Mask |
| PRB6 | ΔBFW1-6 | RE Mask |
| PRB5 | ΔBFW1-5 | RE Mask |
| PRB4 | ΔBFW1-4 | RE Mask |
| PRB3 | ΔBFW1-3 | RE Mask |
| PRB2 | ΔBFW1-2 | RE Mask |
| PRB1 | ΔBFW1-1 | RE Mask |
| PRB0 | BFW1 | RE Mask |

*FIG. 10C*

| Section Description | Section Extension |
|---|---|
| PRB7 | RE Mask 1<br>BFW1<br>BFW2<br>..<br>BFWn |
| PRB6 | |
| PRB5 | |
| PRB4 | |
| PRB3 | |
| PRB2 | |
| PRB1 | |
| PRB0 | |

FIG. 10D

OPERATING A LOWER LAYER SPLIT CENTRAL UNIT

RELATED APPLICATIONS

The present application is a 35 U.S.C. § 371 national stage application of PCT International Application No. PCT/IB2019/060194 filed on Nov. 26, 2019, which in turn claims the benefit of and priority to U.S. Provisional Patent Application No. 62/773,380, filed Nov. 30, 2018, entitled "TRANSMITTING BEAM WEIGHTS THAT VARY PER RESOURCE ELEMENT FROM A LOWER-LAYER SPLIT CENTRAL UNIT TO A RADIO UNIT," the disclosures of which are hereby incorporated herein by reference in their entirety.

BACKGROUND

The present disclosure relates generally to communications, and more particularly, to wireless communications and related wireless devices and network nodes.

FIG. 1 depicts an example of a wireless communication system 300 represented as a 5G network architecture composed of core network functions (NFs), where interaction between any two NFs is represented by a point-to-point reference point/interface.

Seen from the access side, the 5G network architecture shown in FIG. 1 includes a plurality of User Equipment (UEs) connected to either a Radio Access Network (RAN) or an Access Network (AN) by a wireless interface as well as an Access and Mobility Management Function (AMF). Typically, the R(AN) comprises base stations, such as evolved Node Bs (eNBs) or 5G base stations (gNBs) or similar. Seen from the core network side, the 5G core NFs shown in FIG. 1 include a Network Slice Selection Function (NSSF), an Authentication Server Function (AUSF), a Unified Data Management (UDM), an Access and Mobility Management Function (AMF), a Session Management Function (SMF), a Policy Control Function (PCF), and an Application Function (AF).

One of the aims of the 5G core network is to separate the user plane and control plane. The user plane typically carries user traffic while the control plane typically carries signaling in the network. In FIG. 1, the UPF is in the user plane and all other NFs (i.e., AMF, SMF, PCF, AF, AUSF, and UDM) are in the control plane. Separating the user and control planes enables each plane resource to be scaled independently. Such separation may also allow UPFs to be deployed separately from control plane functions in a distributed fashion.

SUMMARY

Some embodiments provide a method of operating a lower-layer split central unit, LLS-CU in a network node of a wireless communication system. The method includes providing, at the LLS-CU, a plurality of downlink signals to be transmitted to a user equipment, UE, over a wireless radio interface, allocating the plurality of downlink signals to a plurality of resource elements, REs, of a physical downlink channel of the wireless radio interface to be used for transmitting the plurality of downlink signals to the UE, generating a data-associated control information, DACI, message including a section description associated with the plurality of downlink signals, the DACI message including a resource element mask that defines the location of one or more REs within a physical resource block, PRB, of a downlink signal on the physical downlink channel, and an indication of a plurality of sets of beamforming weights to be applied by a radio unit, RU, when transmitting the plurality of downlink signals to the UE, wherein sets of beamforming weights are associated with resource elements according to the resource element mask, transmitting the DACI message to the RU, and transmitting the plurality of downlink signals to the RU for transmission to the UE.

A lower-layer split central unit, LLS-CU in a network node of a wireless communication system according to some embodiments includes a processor circuit, a transceiver coupled to the processor circuit and configured to communicate with a radio unit, RU, and a memory coupled to the processor circuit. The memory includes machine readable program instructions that, when executed by the processor circuit, cause the LLS-CU to perform operations including providing, at the LLS-CU, a plurality of downlink signals to be transmitted to a user equipment, UE over a wireless radio interface, allocating the plurality of downlink signals to a plurality of resource elements, REs, of a physical downlink channel of the wireless radio interface to be used for transmitting the plurality of downlink signals to the UE, generating a data-associated control information, DACI, message including a section description associated with the plurality of downlink signals, the DACI message including a resource element mask and an indication of a plurality of sets of beamforming weights to be applied by a radio unit, RU, when transmitting the plurality of downlink signals to the UE, wherein sets of beamforming weights are associated with resource elements according to the resource element mask, transmitting the DACI message to the RU, and transmitting the plurality of downlink signals to the RU for transmission to the UE.

Some embodiments provide a method of operating a radio unit, RU, in a network node of a wireless communication system. The method includes receiving, from the LLS-CU, a data-associated control information, DACI, message including a section description associated with the plurality of signals, the DACI message including a resource element mask and an indication of a plurality of sets of beamforming weights to be applied by the RU when transmitting the plurality of signals to, or receiving the plurality of signals from, a user equipment, UE, wherein sets of beamforming weights are associated with resource elements according to the resource element mask, and transmitting the plurality of signals to or receiving the plurality of signals from, the UE using the plurality of sets of beamforming weights.

A radio unit, RU, in a network node of a wireless communication system including a lower-layer split central unit, LLS-CU, according to some embodiments includes a processor circuit, a transceiver coupled to the processor circuit and configured to communicate with a radio unit, RU, and a memory coupled to the processor circuit. The memory includes machine readable program instructions that, when executed by the processor circuit, cause the RU to perform operations including receiving, from the LLS-CU, a data-associated control information, DACI, message including a section description associated with the plurality of signals, the DACI message including a resource element mask and an indication of a plurality of sets of beamforming weights to be applied by the RU when transmitting the plurality of signals to, or receiving the plurality of signals from, a user equipment, UE, wherein sets of beamforming weights are associated with resource elements according to the resource element mask, and transmitting the plurality of signals to or receiving the plurality of signals from, the UE using the plurality of sets of beamforming weights.

Some embodiments provide a method of operating a lower-layer split central unit, LLS-CU in a network node of a wireless communication system. The method includes assigning a plurality of uplink signals to a plurality of resource elements, REs, of a physical uplink channel of the wireless radio interface to be used for receiving the plurality of downlink signals from a user equipment, UE, generating a data-associated control information, DACI, message including a section description associated with the plurality of uplink signals, the DACI message including a resource element mask that defines the location of one or more REs within a physical resource block, PRB, of an uplink signal on the physical uplink channel, and an indication of a plurality of sets of beamforming weights to be applied by a radio unit, RU, when receiving the plurality of uplink signals from the UE, wherein sets of beamforming weights are associated with resource elements according to the resource element mask, and transmitting the DACI message to the RU.

A lower-layer split central unit, LLS-CU in a network node of a wireless communication system according to some embodiments includes a processor circuit, a transceiver coupled to the processor circuit and configured to communicate with a radio unit, RU, and a memory coupled to the processor circuit. The memory includes machine readable program instructions that, when executed by the processor circuit, cause the LLS-CU to perform operations including assigning a plurality of uplink signals to a plurality of resource elements, REs, of a physical uplink channel of the wireless radio interface to be used for receiving the plurality of downlink signals from a user equipment, UE, generating a data-associated control information, DACI, message including a section description associated with the plurality of uplink signals, the DACI message including a resource element mask that defines the location of one or more REs within a physical resource block, PRB, of an uplink signal on the physical uplink channel, and an indication of a plurality of sets of beamforming weights to be applied by a radio unit, RU, when receiving the plurality of uplink signals from the UE, wherein sets of beamforming weights are associated with resource elements according to the resource element mask, and transmitting the DACI message to the RU.

Some embodiments provide techniques for signaling multiple beams in a DACI to be used for transmission of PRBs referenced in a single section description of the DACI. Enabling a DACI to specify multiple beams per section may reduce DACI signaling overhead requirements and/or bitrate. Enabling a DACI to specify multiple beams per section may also improve beamforming performance in a radio access network.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 10A to 10D illustrate DACI messages including indications of beamforming weights transmitted from a lower-layer split central unit (LLS-CU) in a network node to a radio unit (RU) according to some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
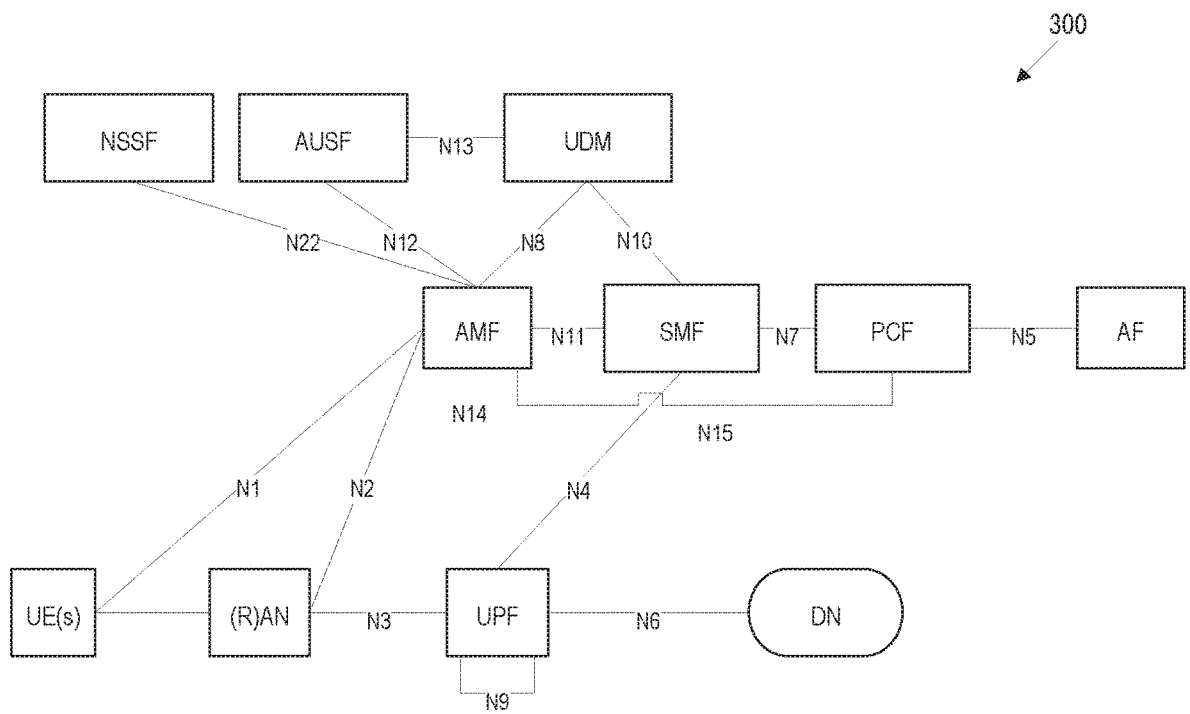
FIG. 1 is a block diagram illustrating an example of a wireless communication system representing 5$^{th}$ Generation Wireless System (5G) network architecture composed of core network functions (NFs)
Figure 2A:
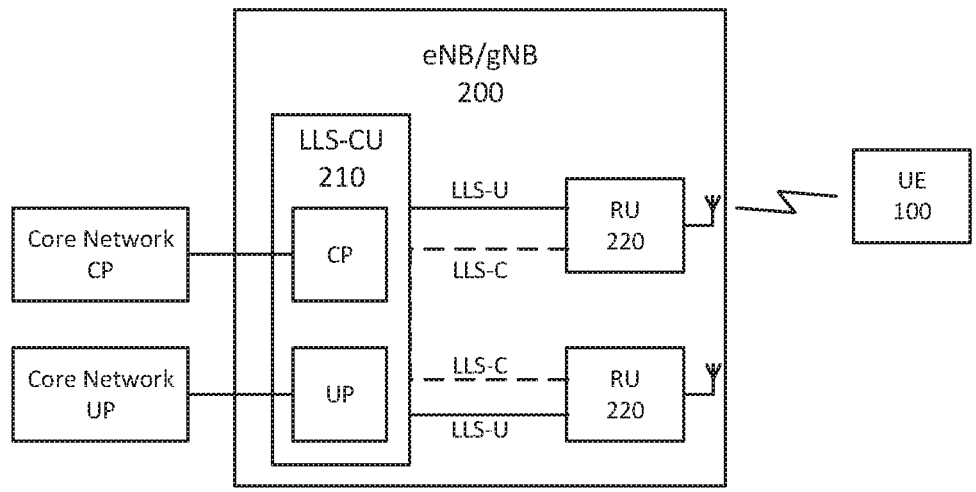
FIG. 2A is a block diagram illustrating an example of a network node including a lower-layer split central unit and a radio unit according to some embodiments.

FIG. 2A depicts an example of a RAN node 200 according to some embodiments. As illustrated in FIG. 2, the RAN node 200 may include an eNB or a gNB with a lower-layer split central unit (LLS-CU) and on or more radio units (RU) connected to the LLS-CU. The LLS-CU is capable of interacting with the RU(s) over the LLS-C control plane(s) and/or the LLS-U user plane(s) on the so-called "fronthaul." As illustrated, the LLS-CU is a logical node that includes the eNB/gNB functions as discussed below. In this regard, the LLS-CU controls the operation of the RU(s) in some embodiments discussed herein. The LLS-CU communicates with the control plane (CP) and user plane (UP) functions of a core network on the backhaul. The RUs transmit and receive downlink and uplink data, respectively, to/from one or more user equipment (UE) nodes 100 via a wireless interface.

Figure 2B:
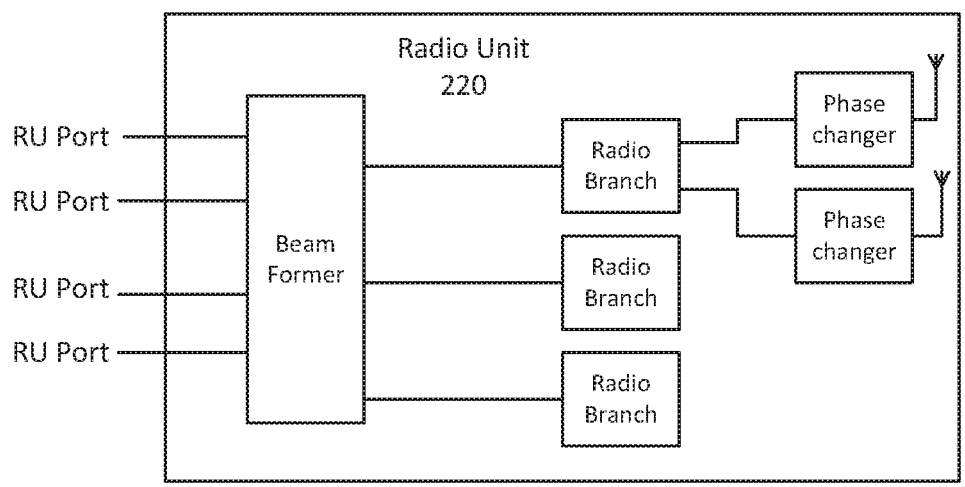
FIG. 2B is a block diagram of a radio unit (RU) according to some embodiments.

FIG. 2B illustrates a radio unit (RU) according to some embodiments. The RU includes a plurality of antenna ports coupled to a beam former which applies beamforming weights to signals received at the antenna ports. Signals output by the beam former are provided via a radio branch to a plurality of antennas.

Figure 3:
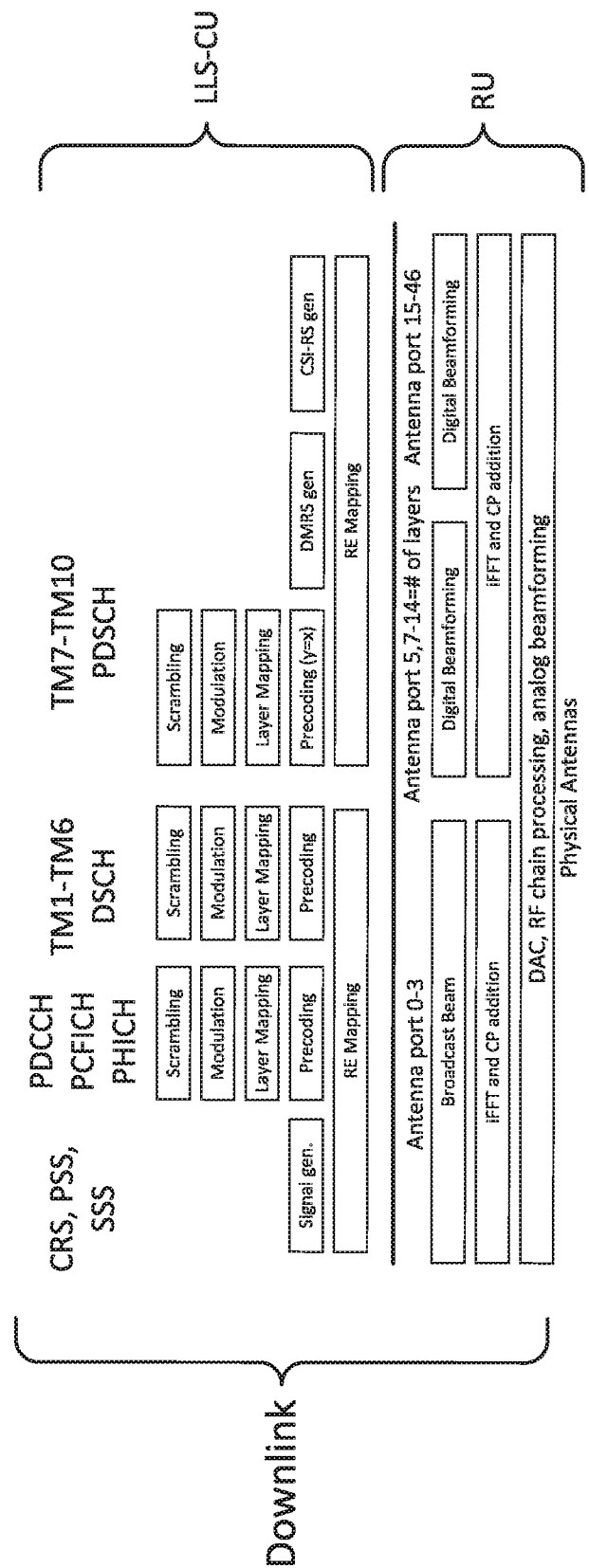
FIG. 3 is a diagram illustrating an example of downlink (DL) functional split for various physical layer channels and transmission modes.

FIG. 3 depicts a downlink (DL) functional split between the LLS-CU and the RU for various physical layer channels and transmission modes. In the DL, iFFT, CP addition, and digital beamforming functions may reside in the RU. Additional PHY functions, including resource element mapping, precoding, layer mapping, modulation, scrambling, rate matching, and coding may reside in the LLS-CU, according to some embodiments.

Figure 4:
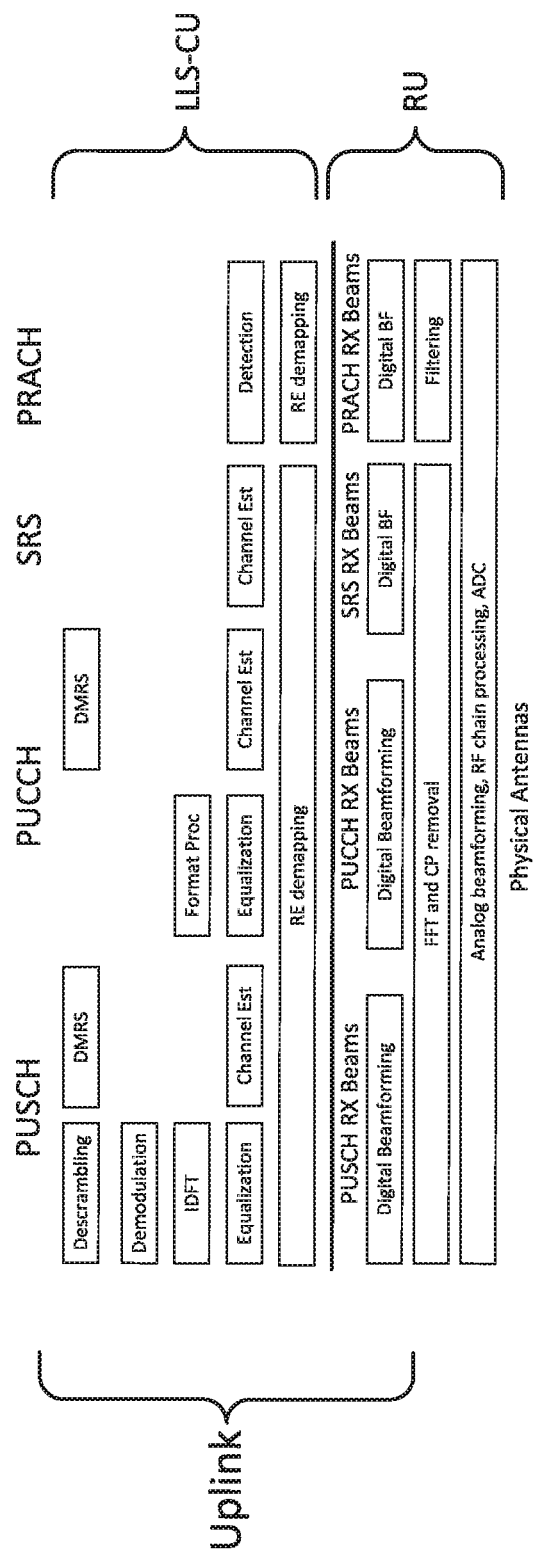
FIG. 4 is a diagram illustrating an example of uplink (UL) functional split for various physical layers channels and transmission modes.

FIG. 4 depicts an uplink (UL) functional split for various physical layer channels and transmission modes. As illustrated in FIG. 4, in the UL, FFT, CP removal, and digital beamforming functions may reside in the RU. Additional PHY functions, including resource element de-mapping, equalization, de-modulation, de-scrambling, rate de-matching, and de-coding, can reside in the LLS-CU, according to some embodiments.

Figure 5:
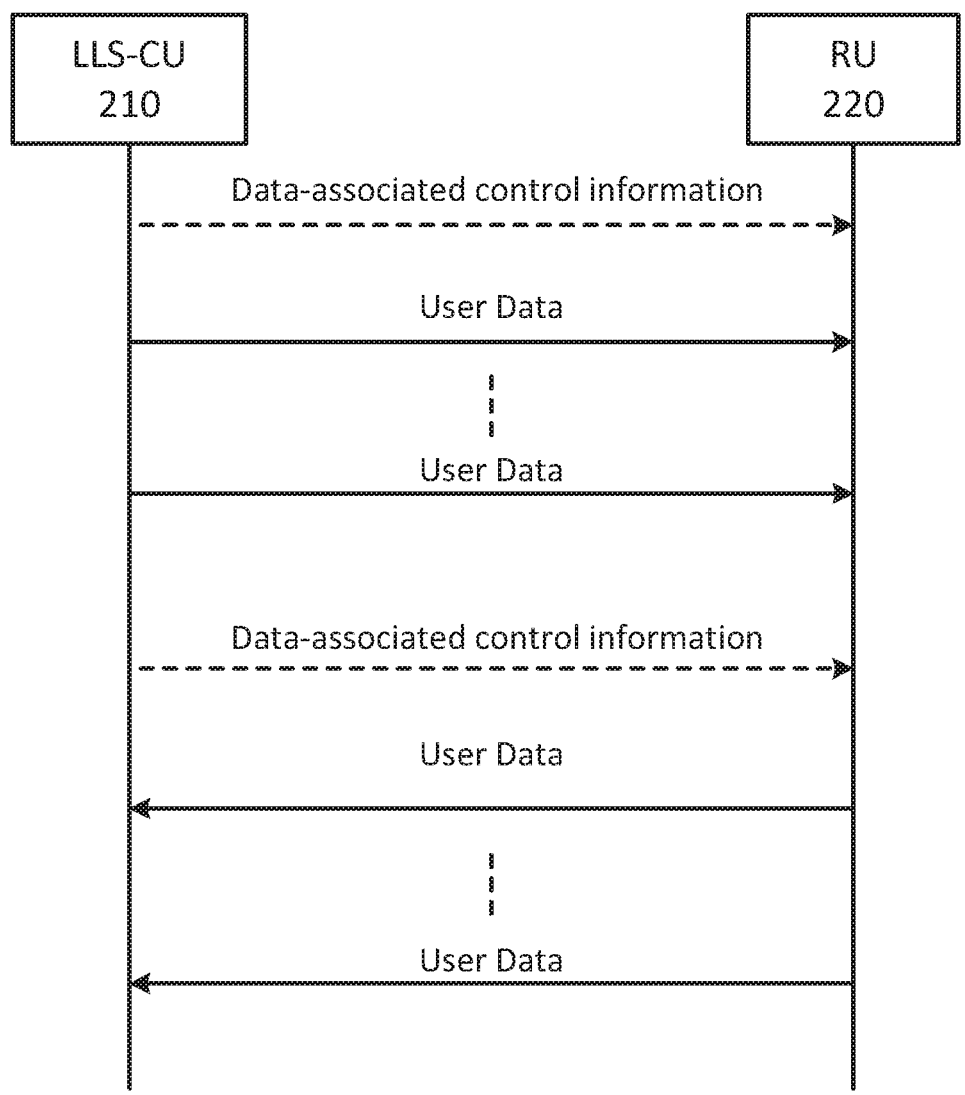
FIG. 5 is a signal flow diagram illustrating an example of operations in a wireless communication network according to some embodiments.

As illustrated in FIG. 5, control plane (CP) messages may be exchanged between an LLS-CU and an RU according to a scheduling and beamforming commands transfer procedure. One purpose of CP messages is to transmit data-associated control information (DACI) required for the processing of user data. For example, in some embodiments, this may include scheduling and/or beamforming commands. Messages may be sent separately for DL-related commands and UL-related commands, as illustrated in FIG. 5. Likewise, for purposes including increased flexibility, CP messages may be sent either jointly or separately depending on the channel for which information is conveyed. For example, PUCCH and PUSCH may be bundled or not bundled into a single CP message depending on implementation.

In some embodiments, a method includes transmitting data-associated control information messages (DACI) from an LLS-CU to an RU. In some embodiments, the DACI includes information that specifies how uplink data is to be received over the air and inserted into a User Data message transferred from the RU to the LLS-CU. In other embodiments, the DACI includes information specifying how downlink data is to be transmitted to a UE. Downlink and uplink user data messages may be referred to herein using the terms UD-DL and UD-UL, respectively.

DACI may exist as different types. In some embodiments, the most commonly used type of DACI is one with a Section Type 1, which contains information describing how regular transmissions are to be performed. In some embodiments, a Section Type 1 DACI message includes a list of Sections, wherein each Section includes:

An identifier to map the DACI and UD-DL or UD-UL to a Section ID;
A data direction, which may include at least an UL or a DL direction;
A range of physical resource blocks (PRBs);
A range of symbols;
Information related to which REs in the PRB range relate to the rest of the information;
A beamforming index and/or weights;
A compression method for beamforming weights; and
A format for user data and/or a compression method.

In some embodiments, the UD-DL and UD-UL messages include:

A corresponding identifier(s) (Section ID and RU_port) as the corresponding Section Type 1 message;
A format for user data and/or a compression method; and
One sample per RE, in any of a number of supported formats.

Figure 6:
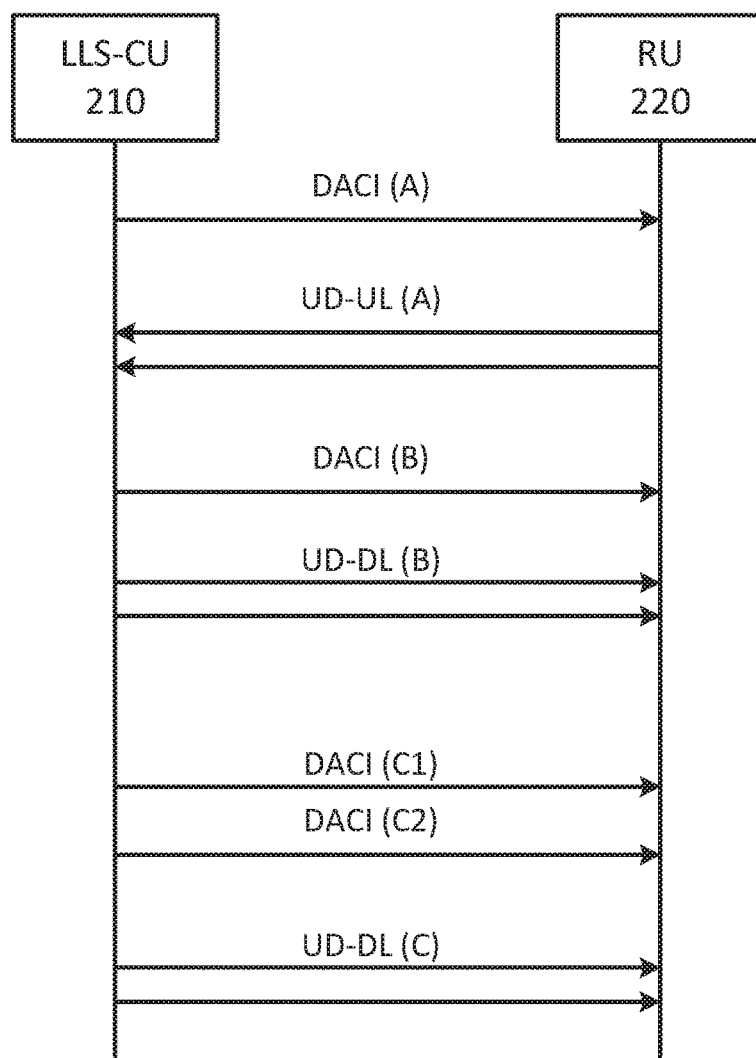
FIG. 6 is a signal flow diagram illustrating an example of signals related to DACI messages according to some embodiments.

FIG. 6 depicts a signal flow diagram related to DACI messages according to some embodiments. As illustrated, one embodiment of DACI(A) is directed to a DACI message sent from the LLS-CU to the RU with information describing a coming reception. In this manner, the RU sends one or more UP-UL messages in correspondence with the request including samples of the received signal over the air. In another embodiment, DACI(B) is directed to a DACI message sent from the LLS-CU to the RU with information describing a coming transmission. The LLS-CU in this embodiment is related to transmitting one or more UP-DL messages containing the information to be transmitted into the air. In yet another embodiment, DACI(C) is directed to two different DACI messages sent from the LLS-CU to the RU with information describing a coming transmission. The two DACI messages describe at least one transmission method for different RE in the same symbol in the same PRB. The LLS-CU in this embodiment then transmits one or more UP-DL messages containing the information to be transmitted into the air, combined for the two DACI.

Figure 7:
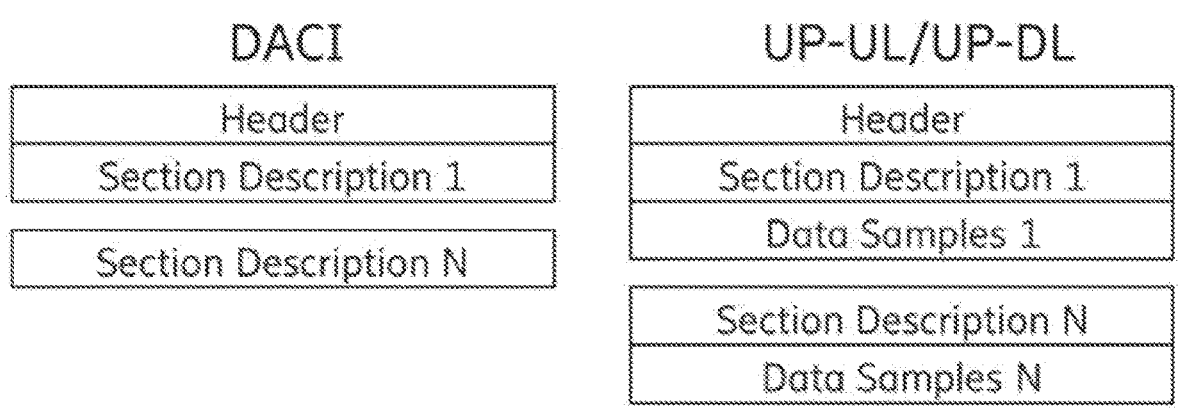
FIG. 7 is a diagram illustrating an example of a DACI and UP-UL/UP-DL according to some embodiments.

FIG. 7 depicts a high level of a protocol of the DACI message and UP-UL/UP-DL messages which carry UD-UL and UD-DL, respectively. In some embodiments, the DACI messages contain a common header, indicating the RU_Port_ID for the DACI, and then a variable set of Sections, each describing a coming transmission. In some embodiments, the UP-UL and UP-DL messages include a common header, indicating the RU_Port_UD for the UP-xx message, and then a variable set of sections, each including a section header indicating the content of the data field, and a data field, containing UD-UL or UD-DL data. The section header according to some embodiments also includes a SectionID to map to the corresponding Section of the DACI message and the format of the data in the data field.

For UP-DL data, a section referenced in a DACI section description may include multiple physical resource blocks (PRBs) in a continuous range of PRBs over a transmission bandwidth to which downlink signals have been allocated, i.e., mapped to REs in the PRB.

Figures 8A, 8B:
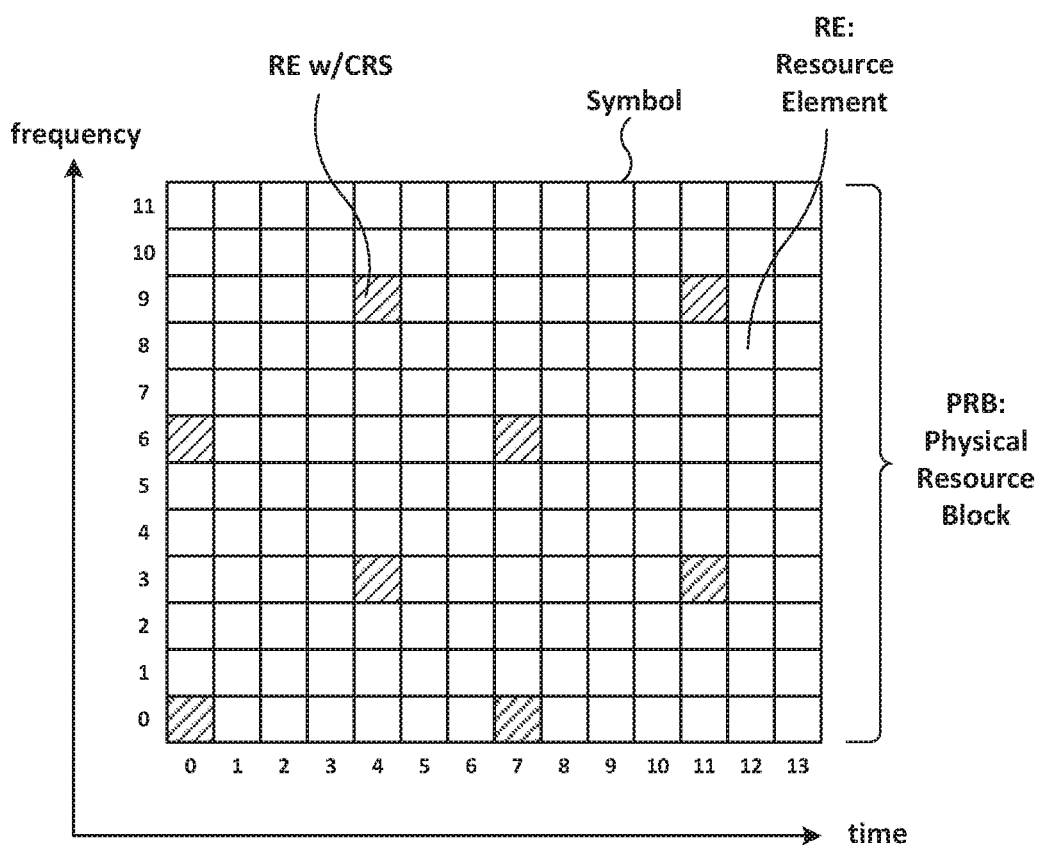
FIG. 8A illustrates an example of a mapping of resource elements to a physical resource block according to some embodiments.
FIG. 8B illustrates a resource element mask according to some embodiments.

FIG. 8A illustrates a PRB to which data to be transmitted in the UP-DL message from the LLS-CU to the RU is mapped. The PRB spans 14 OFDM symbols in the time dimension (horizontal axis) and 12 frequency subchannels in the frequency dimension (vertical axis). Each time/frequency element in the PRB corresponds to an RE of the PRB. In the example of FIG. 8, the PRB includes cell-specific reference symbols (CRS) in predefined locations within the PRB. As shown in FIG. 8. the PRB includes two REs carrying CRS in symbols 0, 4, 7 and 11.

FIG. 8B illustrates a resource element mask, reMask, which is a two dimensional matrix that indicates the position of selected resource elements within a PRB. In this case, the reMask indicates the locations of REs within the PRB of FIG. 8A that carry CRS information. The presence of a selected resource element is indicated by a '1' in the reMask, while the absence of a selected resource element is indicated by a '0', although the meanings of the symbols could be reversed.

In a multiple antenna system, a DACI message can specify or request a particular antenna beam for a given section, where an antenna beam is specified by a set of beamforming weights used by the radio unit to transmit downlink signals to UEs.

Beamforming is schematically illustrated in FIG. 9, which shows a radio unit including a beamformer coupled to an array of antenna elements 901. Beamforming is a signal processing technique by which antenna arrays (i.e., antennas including a plurality of individually fed antenna elements) can be driven in in such a way that signals at particular angles experience constructive interference while others experience destructive interference. To change the directionality of the array when transmitting or receiving, the beamformer individually controls the phase and amplitude of the signal transmitted or received at each antenna element to create a pattern of constructive and destructive interference that can amplify the overall signal in one direction and attenuate the overall signal in another direction.

The phase and amplitude of the signal transmitted/received by a particular antenna element is controlled by applying a complex weight, called a beamforming weight, to the signal transmitted by the antenna element. Accordingly, to form a beam from an antenna array, the beamformer applies a set of beamforming weights to the signal prior to transmission or after reception.

Beamforming weights may be frequency dependent. That is, the beamforming weights needed to form a beam to the desired user (UE2) for transmission/reception at one frequency may be different from the beamforming weights needed to form a beam to the desired user for transmission/reception at a different frequency.

A particular antenna beam is associated with a set of beamforming weights used to generate the antenna beam. Accordingly, the terms "antenna beam" and "beamforming weights" or "set of beamforming weights" may be used interchangeably as the context provides.

Figure 9A:
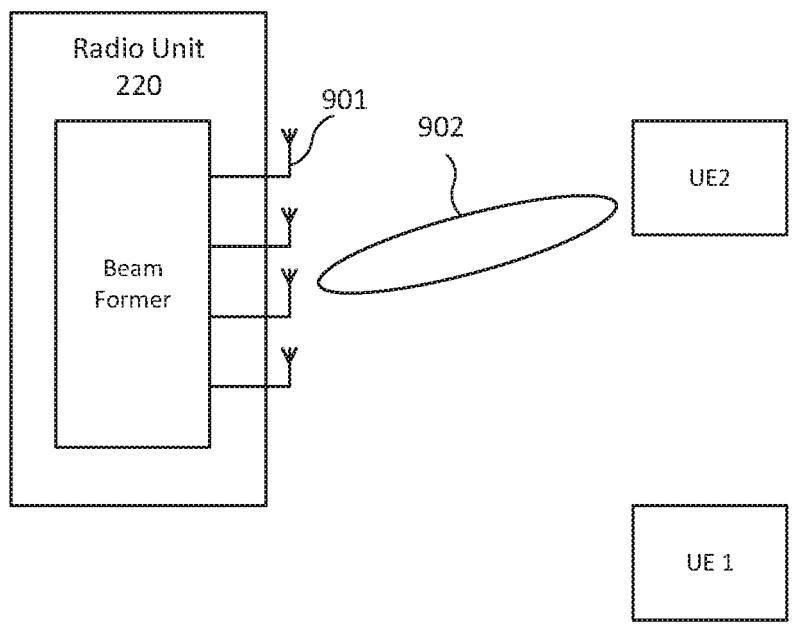
FIG. 9A illustrates beamforming by an RU in a radio access network according to some embodiments.

As shown in FIG. 9A, signals transmitted/received by the antenna elements 901 may form a beam 902 by interfering constructively in a direction of a desired receiver (UE2), resulting in antenna gain at that location. Likewise, the signals transmitted/received by the antenna elements 901 may interfere destructively in a direction of another UE (UE1), thereby potentially reducing interference to/from that user.

A beam may be specified in the DACI, for example, by explicitly signaling the set of beamforming weights to be used by the RU when transmitting/receiving signals in the PRBs or by specifying a beam index associated with a set of beamforming weights to be used by the RU when transmitting/receiving signals in the PRBs. The RU may store a table including sets of beamforming weights and associated indices.

Although a DACI message may specify a particular beam to be used by the RU to transmit downlink signals or receive uplink signals in PRBs specified in a corresponding section, previously, only one beam could be specified per section. Because a section references multiple PRBs (e.g., potentially 100 or more PRBs), the PRBs referenced in the section may span a large bandwidth. Because beamforming weights are frequency dependent, a single set of beamforming weights may not be suitable for all of the PRBs in a section. To request multiple beams, PRBs would have to be divided into different sections, increasing the overhead of the DACI transmission.

Some embodiments provide techniques for signaling multiple beams in a DACI to be used for transmission of PRBs referenced in a single section description of the DACI. Enabling a DACI to specify multiple beams per section may reduce DACI signaling overhead requirements and/or bitrate. Enabling a DACI to specify multiple beams per section may also improve beamforming performance in a radio access network.

In addition, in some cases, all of the reference symbols in the same OFDM symbol may not be sent in the same direction. Reference symbols, such as CRS, are typically repeated every 1-10 ms, depending on the standard and numerology involved. It is typically desirable to repeat reference symbols as often as possible to increase the robustness of the system and to reduce the time-to-lock for UEs. Accordingly, some embodiments enable an LLS-CU to specify, in a single DACI message, additional beams that can be used for REs in the same PRB.

Figure 9B:
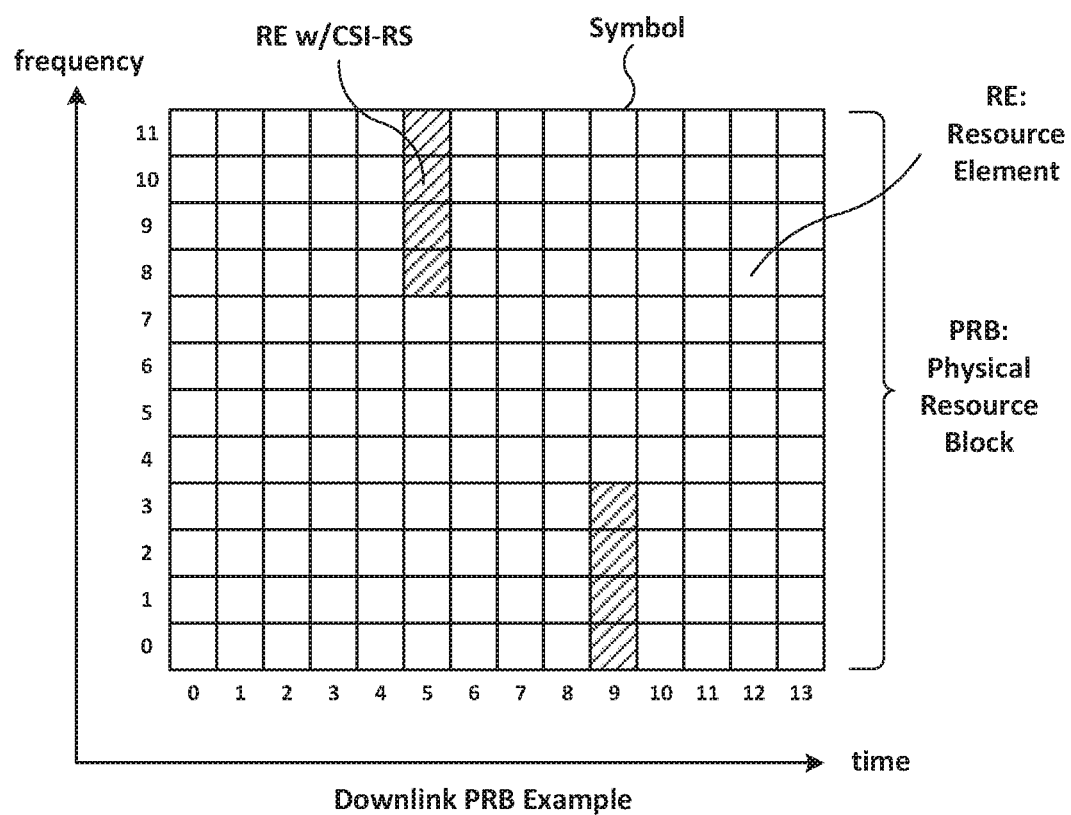
FIG. 9B illustrates a PRB including CSI-RS reference symbols in subcarriers 8, 9, 10 and 11.

FIG. 9B illustrates the transmission of reference symbols in different directions, i.e., using different beams, within the same symbol. In particular, FIG. 9B illustrates a PRB including 13 symbols, each spanning 12 subcarriers. Symbol 5 includes CSI-RS reference symbols in subcarriers 8, 9, 10 and 11. Some embodiments enable an RU to transmit the CSI-RS symbols in four different antenna beams 902A, 902B, 902C and 902D to a UE 905 within the same PRB.

The purpose of these signals is to allow the UE 905 to measure CSI-RS on DL transmissions in different directions and then report back to the base station which direction has the best signal quality.

Figure 9C:
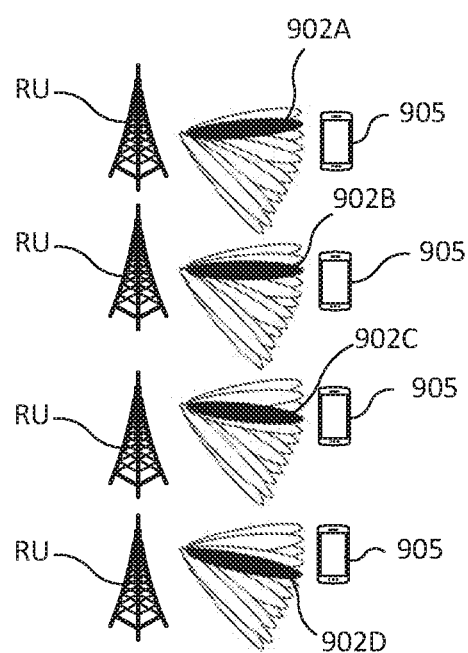
FIG. 9C illustrates the transmission of REs using different beams in the same symbol of a PRB according to some embodiments.

The RU cannot continuously send in all directions, so it determines when it makes sense to send data in a few directions, and signals that it will do so to the UE. It may be desirable for the RU to send CSI-RS in as many directions as possible using as few REs as possible. To reduce or minimize the acquisition time, this may be done in the same symbol. As FIG. 9C shows, the RU in this case transmits the CSI-RS to the UE in four different directions using four different antenna beams in the same symbol. This requires four sets of beamforming weights. This may be accomplished using four different RU ports, or by sending multiple beam forming weights, individually for each RE, on the same RU port. Using multiple sets of beamforming weights on the same RU port may reduce the amount of signaling needed and/or allow RUs that support a low number of simultaneous layers (e.g. 2 layers) to still send/receive CSI-RS in more directions.

It will be expected that the same set of directions will be tested often for a given RU/UE pair, in which case a predefined set of directions may be defined and stored in the RU. The predefined set of directions may be referenced by a single beam index in some embodiments.

Currently, the beam can be controlled by including a beam Index to a predefined beam in the DACI Section and/or by including a set of beamforming weights or beamforming attributes in a Section Extension field. A beam index may be assigned to the set of beamforming weights for future reference to the same beam.

In some embodiments, an LLS-CU can specify via a DACI message, a plurality of antenna beams to be used by the RU to transmit or receive signals on a per-RE basis. In some embodiments, the DACI may include a resource element mask, or reMask, along with an indication of a beam associated with the reMask. The RU transmits REs specified in the RE mask using the associated beam.

Some embodiments may provide Section Extension type containing beamforming weights, beamforming attributes and/or beam indexes associated with an reMask and/or with individual REs identified in the reMask. Some embodiments may provide a beamforming template in the management plane that can be referenced using a beam index or other defined field in the DACI.

Various examples of the inventive concepts are illustrated in FIGS. 10A to 10D. Referring to FIG. 10A, a DACI that includes a Section Description that describes a downlink transmission bandwidth including 8 PRBs is illustrated. The DACI includes a Section Extension that defines (either explicitly or via reference to a beam index) a first set of beamforming weights, BFW1, that are to be used by the RU for transmitting signals on resource elements specified in a reMask (RE Mask 1) within PRB0 to PRB7 along with a set of default beamforming weights, BFW0, to be used by the RU for transmitting on the remaining resource elements.

FIG. 10B illustrates a DACI that includes a Section Description that describes a downlink transmission bandwidth including 8 PRBs according to further embodiments. The DACI includes a Section Extension that defines a first set of beamforming weights, BFW1, that are to be used by the RU for transmitting signals on REs defined by reMask 1 within PRB0 to PRB3, and a second set of beamforming weights, BFW2, that are to be used by the RU for transmitting signals on REs defined by reMask 2 within PRB4 to PRB7. Optionally, a first default set of beamforming weights BFW0-1 may be specified for PRB0 to 3, while a second default set of beamforming weights BFW0-2 may be specified for PRB4 to 7.

FIG. 10C illustrates a DACI that includes a Section Description that describes a downlink transmission bandwidth including 8 PRBs according to further embodiments. The DACI includes a Section Extension that indicates 8 sets of beamforming weights that are to be used by the RU for transmitting respective ones of the PRBs according to respective reMasks for each PRB. In the example of FIG. 10C, the first set of beamforming weights, BFW1, associated with PRB0 are signaled explicitly or by reference to a beam index, and the other sets of beamforming weights (ΔBFW1-1, ΔBFW1-2, etc.) are signaled via delta coding, i.e., based on their difference from the first set of beamforming weights BFW1. That is, other sets of beamforming weights, ΔBFW1-1, ΔBFW1-2, etc., are coded based on their difference with the first set of beamforming weights BFW1. Thus, for example, the first set of beamforming weights BFW1 may be indicated by a beam index, while the second set of beamforming weights ΔBFW1-1 may be indicated based on differences with the first set of beamforming weights BFW1.

FIG. 10D illustrates a DACI that includes a Section Description that describes a downlink transmission bandwidth including 8 PRBs according to further embodiments. In this example, n sets of beamforming weights BFW1, BFW2, BFW3 are specified along with a reMask such that a separate set of beamforming weights may be provided for each resource element identified in the reMask. For example, if the reMask specifies 10 resource element locations, then ten sets of beamforming weights may be indicated along with the reMask. The beamforming weights may be signaled explicitly, by beam index or by delta coding as described above.

Operations of an LLS-CU in a RAN node, such as a gNB, will now be discussed with reference to the RAN node 200 illustrated in FIG. 13. For example, modules may be stored in memory 208 of FIG. 13 and these modules may provide instructions so that when the instructions of a module are executed by processor 206, processor 206 performs respective operations described below.

Figure 11A:
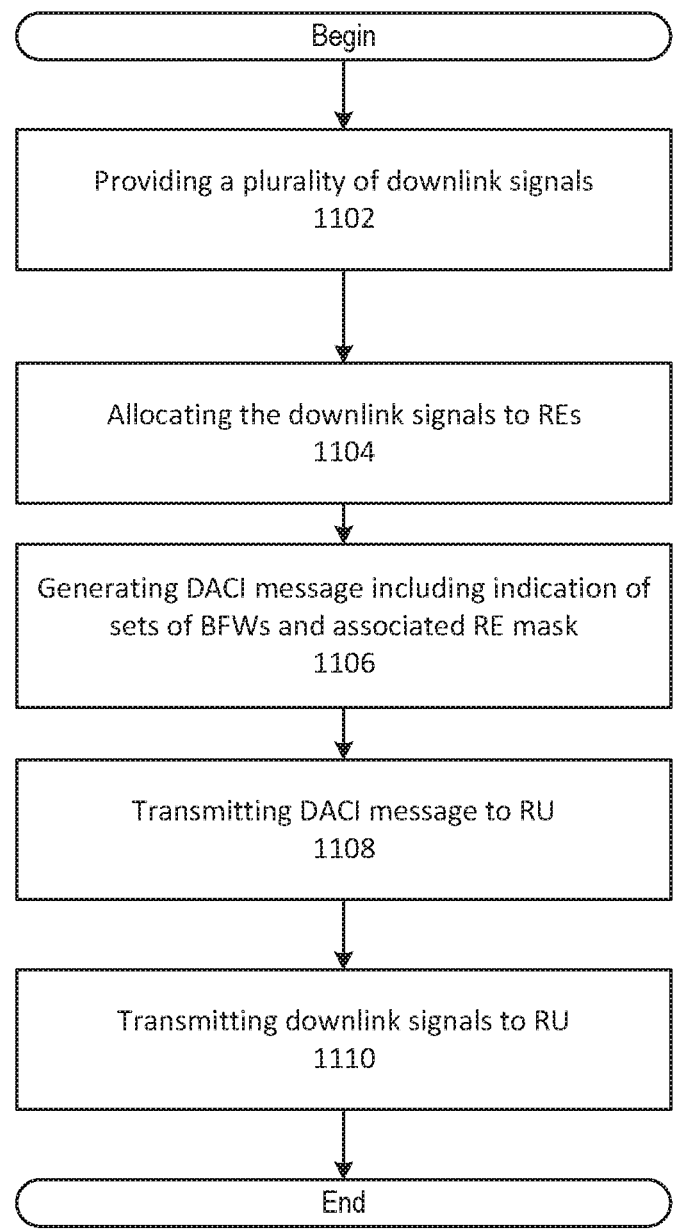
FIGS. 11A and 11B are flow charts illustrating operations of an LLS-CU according to some embodiments.

FIG. 11A depicts an example of operations for transmitting beam forming weights from an LLS-CU to an RU in a network node of a wireless communication system. As shown therein, the method includes providing (1102), at the LLS-CU, a plurality of downlink signals to be transmitted to a user equipment, UE, over a wireless radio interface, allocating (1104) the plurality of downlink signals to a plurality of resource elements, REs, of a physical downlink channel of the wireless radio interface to be used for transmitting the plurality of downlink signals to the UE, generating (1106) a data-associated control information, DACI, message including a section description associated with the plurality of downlink signals, the DACI message including a resource element mask that defines the location of one or more REs within a physical resource block, PRB, of a downlink signal on the physical downlink channel, and an indication of a plurality of sets of beamforming weights to be applied by a radio unit, RU, when transmitting the plurality of downlink signals to the UE, wherein sets of beamforming weights are associated with resource elements according to the resource element mask, transmitting (1108) the DACI message to the RU, and transmitting (1110) the plurality of downlink signals to the RU for transmission to the UE.

The plurality of downlink signals may be assigned to a plurality of PRBs in a section associated with the section description, and the RE mask defines positions of REs for all PRBs in the section.

The method may further include providing an indication of a unique set of beamforming weights for each position defined in the RE mask.

The method may further include providing an indication of a unique set of beamforming weights for each RE in the section at a location in a PRB corresponding to a position defined in the RE mask.

The indication of a set of beamforming weights applies to each RE at a location in a PRB corresponding to a position defined in the RE mask.

The indication of the plurality of sets of beamforming weights may include the plurality of sets of beamforming weights.

The indication of the plurality of sets of beamforming weights may include a plurality of beam indices, each of the beam indices corresponding to one of the plurality of sets of beamforming weights.

The indication of the plurality of sets of beamforming weights may include a plurality of sets of beamforming attributes that describe respective antenna beams.

The indication of the plurality of sets of beamforming weights is carried in a section extension of the section description.

The section description may include a plurality of section extensions, wherein each section extension of the plurality of section extensions identifies one of the plurality of sets of beamforming weights.

The indication of the plurality of sets of beamforming weights may include a first set of complete beamforming weights and at least one set of delta-coded beamforming weights that are delta-coded with respect to the first set of complete beamforming weights.

Figure 11B:
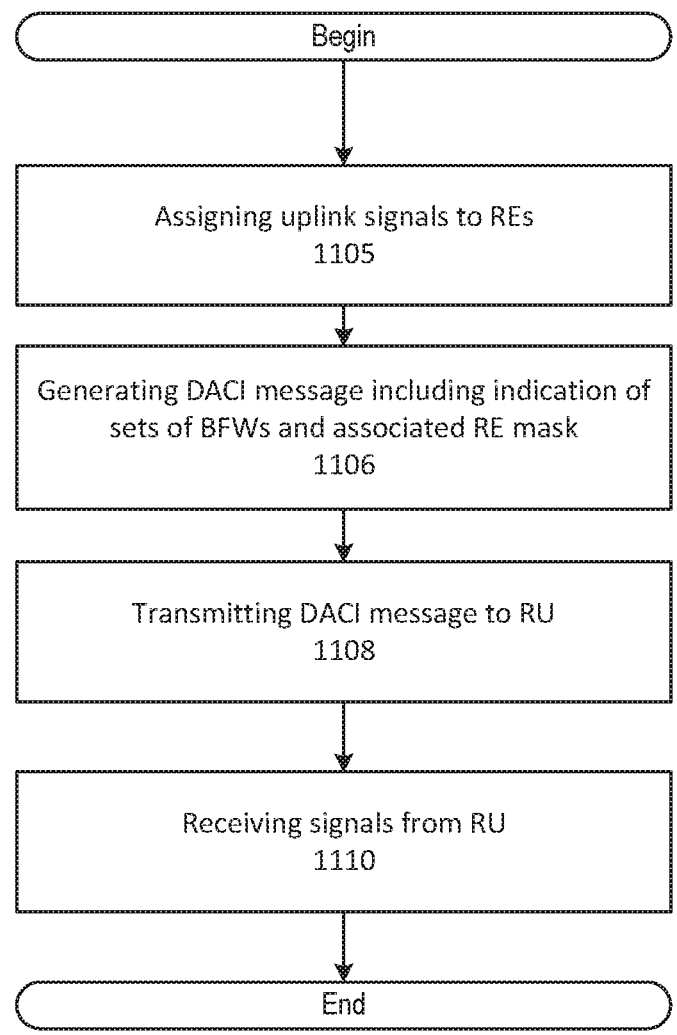

Referring to FIG. 11B, a method of operating a LLS-CU in a network node of a wireless communication system according to further embodiments includes assigning (1105) a plurality of uplink signals to a plurality of resource elements, REs, of a physical uplink channel of the wireless radio interface to be used for receiving the plurality of downlink signals from a user equipment, UE, generating (1106) a data-associated control information, DACI, message including a section description associated with the plurality of uplink signals, the DACI message including a resource element mask that defines the location of one or more REs within a physical resource block, PRB, of an uplink signal on the physical uplink channel, and an indication of a plurality of sets of beamforming weights to be applied by a radio unit, RU, when receiving the plurality of uplink signals from the UE, wherein sets of beamforming weights are associated with resource elements according to the resource element mask, and transmitting (1108) the DACI message to the RU. The LLS-CU may then receive (1110) the uplink signals from the RU.

Figure 12:
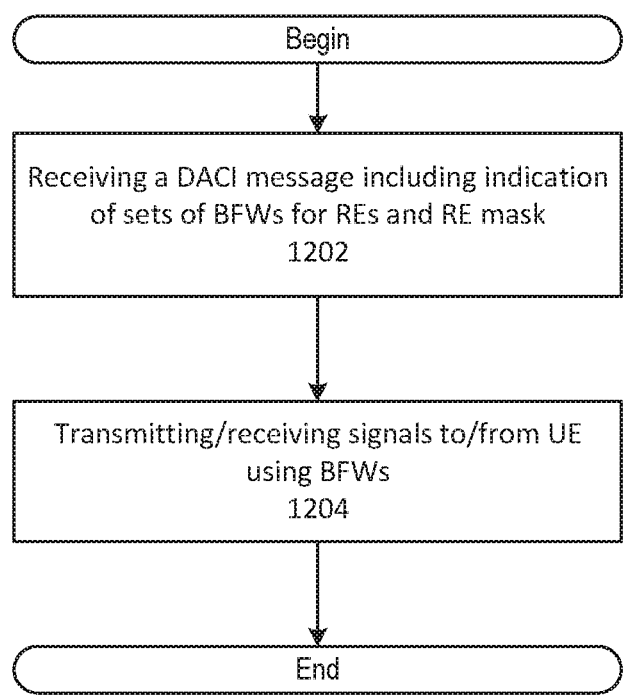
FIG. 12 is a flow chart illustrating operations of an RU according to some embodiments.

FIG. 12 illustrates a method of operating a radio unit, RU, in a network node of a wireless communication system. The method includes receiving (1202), from the LLS-CU, a data-associated control information, DACI, message including a section description associated with the plurality of signals, the DACI message including a resource element mask and an indication of a plurality of sets of beamforming weights to be applied by the RU when transmitting the plurality of signals to, or receiving the plurality of signals from, a user equipment, UE, wherein sets of beamforming weights are associated with resource elements according to the resource element mask, and transmitting (1204) the plurality of signals to or receiving the plurality of signals from, the UE using the plurality of sets of beamforming weights.

The indication of the plurality of sets of beamforming weights may include an indication of which of the plurality of sets of beamforming weights is to be applied to each of the plurality of REs used to transmit the plurality of downlink signals.

The indication of the plurality of sets of beamforming weights may include the plurality of sets of beamforming weights.

The indication of the plurality of sets of beamforming weights may include a plurality of beam indices, each of the beam indices corresponding to one of the plurality of sets of beamforming weights.

The indication of the plurality of sets of beamforming weights may include a plurality of sets of beamforming attributes that describe respective antenna beams.

The indication of the plurality of sets of beamforming weights is carried in a section extension of the section description.

The section description may include a plurality of section extensions, wherein each section extension of the plurality of section extensions identifies one of the plurality of sets of beamforming weights.

The indication of the plurality of sets of beamforming weights may include a first set of complete beamforming weights and at least one set of delta-coded beamforming weights that are delta-coded with respect to the first set of complete beamforming weights.

Various embodiments provide a network node that includes a processor circuit, a transceiver coupled to the processor circuit, and a memory coupled to the processor circuit. The memory includes machine-readable computer program instructions that, when executed by the processor circuit, cause the processor circuit to perform some of the operations depicted in FIGS. 11-12.

Figure 13:
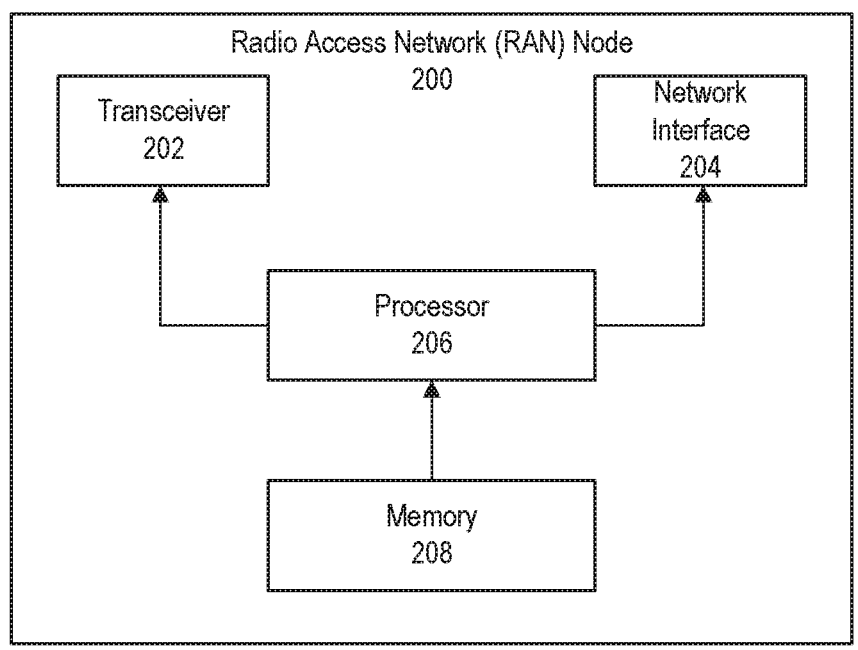
FIG. 13 is a block diagram illustrating an example of a radio access network (RAN) node according to some embodiments.

FIG. 13 depicts an example of a RAN node 200 (also referred to as a network node, base station, eNB, eNodeB, gNB, gNodeB, etc.) of a wireless communication network configured to provide cellular communication according to embodiments of inventive concepts. The RAN node 200 may correspond to a central unit, a radio unit or a combination of a central unit and a radio unit in a RAN node. As shown, RAN node 200 may include a transceiver circuit 202 (also referred to as a transceiver) including a transmitter and a receiver configured to provide uplink and downlink radio communications with wireless devices. The RAN node 200 may include a network interface circuit 204 (also referred to as a network interface) configured to provide communications with other nodes (e.g., with other base stations and/or core network nodes) of the wireless communication network. The RAN node 200 may also include a processor circuit 206 (also referred to as a processor) coupled to the transceiver circuit 202, and a memory circuit 208 (also referred to as memory) coupled to the processor circuit 206. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

A further example of a RAN node 200 in the context of a network is the network node QQ160 shown in FIG. 14 and described in more detail below.

As discussed herein, operations of the RAN node 200 may be performed by processor 206, network interface 204, and/or transceiver 202. For example, processor 206 may control transceiver 202 to transmit downlink communications through transceiver 202 over a radio interface to one or more UEs and/or to receive uplink communications through transceiver 202 from one or more UEs over a radio interface. Similarly, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations (e.g., operations discussed below with respect to example embodiments). In addition, a structure similar to that of FIG. 13 may be used to implement other network nodes, for example, omitting transceiver 202. Moreover, network nodes discussed herein may be implemented as virtual network nodes.

A lower-layer split central unit, LLS-CU in a network node of a wireless communication system, includes a processor circuit (206), a transceiver (202) coupled to the processor circuit and configured to communicate with a radio unit, RU, and a memory (208) coupled to the processor circuit, the memory including machine readable program instructions that, when executed by the processor circuit, cause the LLS-CU to perform operations including providing (1102), at the LLS-CU, a plurality of downlink signals to be transmitted to a user equipment, UE over a wireless radio interface, allocating (1104) the plurality of downlink signals to a plurality of resource elements, REs, of a physical downlink channel of the wireless radio interface to be used for transmitting the plurality of downlink signals to the UE, generating (1106) a data-associated control information, DACI, message including a section description associated with the plurality of downlink signals, the DACI message including a resource element mask and an indication of a plurality of sets of beamforming weights to be applied by a radio unit, RU, when transmitting the plurality of downlink signals to the UE, wherein sets of beamforming weights are associated with resource elements according to the resource element mask, transmitting (1108) the DACI message to the RU, and transmitting (1110) the plurality of downlink signals to the RU for transmission to the UE.

A lower-layer split central unit, LLS-CU in a network node of a wireless communication system includes a processor circuit (206), a transceiver (202) coupled to the processor circuit and configured to communicate with a radio unit, RU, and a memory (208) coupled to the processor circuit, the memory comprising machine readable program instructions that, when executed by the processor circuit, cause the LLS-CU to perform operations including assigning (1105) a plurality of uplink signals to a plurality of resource elements, REs, of a physical uplink channel of the wireless radio interface to be used for receiving the plurality of downlink signals from a user equipment, UE, generating (1106) a data-associated control information, DACI, message including a section description associated with the plurality of uplink signals, the DACI message including a resource element mask that defines the location of one or more REs within a physical resource block, PRB, of an uplink signal on the physical uplink channel, and an indication of a plurality of sets of beamforming weights to be applied by a radio unit, RU, when receiving the plurality of uplink signals from the UE, wherein sets of beamforming weights are associated with resource elements according to the resource element mask, and transmitting (1108) the DACI message to the RU.

A radio unit, RU, in a network node of a wireless communication system including a lower-layer split central unit, LLS-CU, the RU includes a processor circuit (206), a transceiver (202) coupled to the processor circuit and configured to communicate with a radio unit, RU, and a memory (208) coupled to the processor circuit, the memory including machine readable program instructions that, when executed by the processor circuit, cause the RU to perform operations including receiving (1202), from the LLS-CU, a data-associated control information, DACI, message including a section description associated with the plurality of signals, the DACI message including a resource element mask and an indication of a plurality of sets of beamforming weights to be applied by the RU when transmitting the plurality of signals to, or receiving the plurality of signals from, a user equipment, UE, wherein sets of beamforming weights are associated with resource elements according to the resource element mask, and transmitting (1204) the plurality of signals to or receiving the plurality of signals from, the UE using the plurality of sets of beamforming weights.

Listing of Example Embodiments

Example Embodiments are discussed below. Reference numbers/letters are provided in parenthesis by way of example/illustration without limiting example embodiments to particular elements indicated by reference numbers/letters.

Embodiment 1. A method of operating a lower-layer split central unit, LLS-CU in a network node of a wireless communication system, comprising:

providing, at the LLS-CU, a plurality of downlink signals to be transmitted to a user equipment, UE, over a wireless radio interface;

allocating the plurality of downlink signals to a plurality of resource elements, REs, of a physical downlink channel of the wireless radio interface to be used for transmitting the plurality of downlink signals to the UE;

generating a data-associated control information, DACI, message including a section description associated with the plurality of downlink signals, the DACI message including a resource element mask that defines the location of one or more REs within a physical resource block, PRB, of a downlink signal on the physical downlink channel, and an indication of a plurality of sets of beamforming weights to be applied by a radio unit, RU, when transmitting the plurality of downlink signals to the UE, wherein sets of beamforming weights are associated with resource elements according to the resource element mask;

transmitting the DACI message to the RU; and transmitting the plurality of downlink signals to the RU for transmission to the UE.

Embodiment 2. The method of Embodiment 1, wherein:

the plurality of downlink signals are assigned to a plurality of PRBs in a section associated with the section description; and the RE mask defines positions of REs for all PRBs in the section.

Embodiment 3. The method of Embodiment 2, further comprising:

providing an indication of a unique set of beamforming weights for each position defined in the RE mask.

Embodiment 4. The method of Embodiment 2, further comprising:

providing an indication of a unique set of beamforming weights for each RE in the section at a location in a PRB corresponding to a position defined in the RE mask.

Embodiment 5. The method of Embodiment 2, wherein the indication of a set of beamforming weights applies to each RE at a location in a PRB corresponding to a position defined in the RE mask.

Embodiment 6. The method of any preceding Embodiment, wherein the indication of the plurality of sets of beamforming weights comprises the plurality of sets of beamforming weights.

Embodiment 7. The method of any preceding Embodiment, wherein the indication of the plurality of sets of beamforming weights comprises a plurality of beam indices, each of the beam indices corresponding to one of the plurality of sets of beamforming weights.

Embodiment 8. The method of Embodiment 1, wherein the indication of the plurality of sets of beamforming weights comprises a plurality of sets of beamforming attributes that describe respective antenna beams.

Embodiment 9. The method of any preceding Embodiment, wherein the indication of the plurality of sets of beamforming weights is carried in a section extension of the section description.

Embodiment 10. The method of Embodiment 9, wherein the section description comprises a plurality of section extensions, wherein each section extension of the plurality of section extensions identifies one of the plurality of sets of beamforming weights.

Embodiment 12. The method of any preceding Embodiment, wherein the indication of the plurality of sets of beamforming weights comprises a first set of complete beamforming weights and at least one set of delta-coded beamforming weights that are delta-coded with respect to the first set of complete beamforming weights.

Embodiment 13. A lower-layer split central unit, LLS-CU in a network node of a wireless communication system, comprising:
  a processor circuit;
  a transceiver coupled to the processor circuit and configured to communicate with a radio unit, RU; and
  a memory coupled to the processor circuit, the memory comprising machine readable program instructions that, when executed by the processor circuit, cause the LLS-CU to perform operations comprising:
    providing, at the LLS-CU, a plurality of downlink signals to be transmitted to a user equipment, UE over a wireless radio interface;
    allocating the plurality of downlink signals to a plurality of resource elements, REs, of a physical downlink channel of the wireless radio interface to be used for transmitting the plurality of downlink signals to the UE;
    generating a data-associated control information, DACI, message including a section description associated with the plurality of downlink signals, the DACI message including a resource element mask and an indication of a plurality of sets of beamforming weights to be applied by a radio unit, RU, when transmitting the plurality of downlink signals to the UE, wherein sets of beamforming weights are associated with resource elements according to the resource element mask;
    transmitting the DACI message to the RU; and
    transmitting the plurality of downlink signals to the RU for transmission to the UE.

Embodiment 14. A method of operating a radio unit, RU, in a network node of a wireless communication system, comprising:
  receiving, from the LLS-CU, a data-associated control information, DACI, message including a section description associated with the plurality of signals, the DACI message including a resource element mask and an indication of a plurality of sets of beamforming weights to be applied by the RU when transmitting the plurality of signals to, or receiving the plurality of signals from, a user equipment, UE, wherein sets of beamforming weights are associated with resource elements according to the resource element mask; and
  transmitting the plurality of signals to or receiving the plurality of signals from, the UE using the plurality of sets of beamforming weights.

Embodiment 15. The method of Embodiment 14, wherein the indication of the plurality of sets of beamforming weights comprises an indication of which of the plurality of sets of beamforming weights is to be applied to each of the plurality of REs used to transmit or receive the plurality of signals.

Embodiment 16. The method of Embodiment 14 or 15, wherein the indication of the plurality of sets of beamforming weights comprises the plurality of sets of beamforming weights.

Embodiment 17. The method of any of Embodiments 14 to 16, wherein the indication of the plurality of sets of beamforming weights comprises a plurality of beam indices, each of the beam indices corresponding to one of the plurality of sets of beamforming weights.

Embodiment 18. The method of Embodiment 14, wherein the indication of the plurality of sets of beamforming weights comprises a plurality of sets of beamforming attributes that describe respective antenna beams.

Embodiment 19. The method of any of Embodiments 14 to 18, wherein the indication of the plurality of sets of beamforming weights is carried in a section extension of the section description.

Embodiment 20. The method of Embodiment 19, wherein the section description comprises a plurality of section extensions, wherein each section extension of the plurality of section extensions identifies one of the plurality of sets of beamforming weights.

Embodiment 21. The method of any of Embodiments 14 to 20, wherein the indication of the plurality of sets of beamforming weights comprises a first set of complete beamforming weights and at least one set of delta-coded beamforming weights that are delta-coded with respect to the first set of complete beamforming weights.

Embodiment 22. A radio unit, RU, in a network node of a wireless communication system including a lower-layer split central unit, LLS-CU, the RU comprising:
  a processor circuit;
  a transceiver coupled to the processor circuit and configured to communicate with a radio unit, RU; and
  a memory coupled to the processor circuit, the memory comprising machine readable program instructions that, when executed by the processor circuit, cause the RU to perform operations comprising:
    receiving, from the LLS-CU, a data-associated control information, DACI, message including a section description associated with the plurality of signals, the DACI message including a resource element mask and an indication of a plurality of sets of beamforming weights to be applied by the RU when transmitting the plurality of signals to, or receiving the plurality of signals from, a user equipment, UE, wherein sets of beamforming weights are associated with resource elements according to the resource element mask; and
    transmitting the plurality of signals to or receiving the plurality of signals from, the UE using the plurality of sets of beamforming weights.

Embodiment 23. A method of operating a lower-layer split central unit, LLS-CU in a network node of a wireless communication system, comprising:

assigning a plurality of uplink signals to a plurality of resource elements, REs, of a physical uplink channel of the wireless radio interface to be used for receiving the plurality of downlink signals from a user equipment, UE;

generating a data-associated control information, DACI, message including a section description associated with the plurality of uplink signals, the DACI message including a resource element mask that defines the location of one or more REs within a physical resource block, PRB, of an uplink signal on the physical uplink channel, and an indication of a plurality of sets of beamforming weights to be applied by a radio unit, RU, when receiving the plurality of uplink signals from the UE, wherein sets of beamforming weights are associated with resource elements according to the resource element mask; and transmitting the DACI message to the RU.

Embodiment 24. A lower-layer split central unit, LLS-CU in a network node of a wireless communication system, comprising:

a processor circuit;

a transceiver coupled to the processor circuit and configured to communicate with a radio unit, RU; and a memory coupled to the processor circuit, the memory comprising machine readable program instructions that, when executed by the processor circuit, cause the LLS-CU to perform operations comprising:

assigning a plurality of uplink signals to a plurality of resource elements, REs, of a physical uplink channel of the wireless radio interface to be used for receiving the plurality of downlink signals from a user equipment, UE;

generating a data-associated control information, DACI, message including a section description associated with the plurality of uplink signals, the DACI message including a resource element mask that defines the location of one or more REs within a physical resource block, PRB, of an uplink signal on the physical uplink channel, and an indication of a plurality of sets of beamforming weights to be applied by a radio unit, RU, when receiving the plurality of uplink signals from the UE, wherein sets of beamforming weights are associated with resource elements according to the resource element mask; and transmitting the DACI message to the RU.

Explanations for abbreviations from the above disclosure are provided below.

| Abbreviation | Explanation |
| --- | --- |
| 3GPP | 3$^{rd}$ Generation Partnership Project |
| 5G | 5$^{th}$ Generation Wireless Systems |
| NG | Next Generation |
| IoT | Internet of Things |
| AKA | Authentication and Key Agreement |
| UICC | Universal Integrated Circuit Card |
| SA2 | 3GPP architecture working group |
| SA3 | 3GPP security group |
| UP | User Plane |
| LTE | Long Term Evolution (4$^{th}$ Generation Wireless System) |
| CP | Control Plane |
| AS | Access Stratum |
| eNB | Evolved Node B |
| UE | User Equipment or End User Device |
| SMC | Security Mode Command |
| RRC | Radio Resource Control |
| PDCP | Packet Data Convergence Protocol |
| RAN | Radio Access Network |
| CN | Core Network |

-continued

| Abbreviation | Explanation |
| --- | --- |
| PDU | Packet Data Unit |
| DRB | Data Radio Bearer |
| AN | Access Network |
| (R)AN | Both 3GPP and non-3GPP Access Networks |
| NAS | Network Access Stratum |
| AMF | Access and Mobility Management Function |
| NF | Network Function |
| UDM | Unified Data Management |
| PCF | Policy Control Function |
| DRB-IP | Data Radio Bearer Integrity Protected |
| IE | Information Element |
| QoS | Quality of Service |
| gNB | Base Station in 5G |
| NEF | Network Exposure Function |
| NWDAF | Network Data Analytics Function |
| PCF | Policy Control Function |
| UDM | Unified Data Management |
| UPF | User Plane Function |
| DL | Downlink |
| UL | Uplink |
| LLS | Lower Layer Split |
| LLS-U | Lower Layer Split User Plane |
| LLS-C | Lower Layer Split Control Plane |
| LLS-CU | Lower Layer Split Central Unit |
| PHY | Physical Layer |
| MP | Management Plane |
| SSM | Synchronization Status Message |
| TRX | Transceiver |

For the purposes of the present document, the following terms and definitions may apply.

Control Plane: refers specifically to real-time control between LLS-CU and RU, and should not be confused with the UE's control plane c_eAxC: component eAxC: a portion of an eAxC flow assigned to a specific LLS-CU processing element.

DownLink: data flow towards the radiating antenna (generally on the LLS interface) eAxC: extended Antenna-Carrier: a data flow for a single antenna (or spatial stream) for a single carrier in a single sector.

Lower Layer Split: logical interface between LLS-CU and RU when using a lower layer (intra-PHY based) functional split.

Lower Layer Split User-plane: logical interface between LLS-CU and RU when using a lower layer functional split.

Lower Layer Split Control-plane: logical interface between LLS-CU and RU when using a lower layer functional split.

High-PHY: those portions of the PHY processing on the LLS-CU side of the fronthaul interface, including FEC encode/decode, scrambling, and modulation/demodulation.

lower-layer split—Central Unit: a logical node hosting PDCP/RLC/MAC/High-PHY layers based on a lower layer functional split.

Low-PHY: those portions of the PHY processing on the RU side of the fronthaul interface, including FFT/iFFT, digital beamforming, and PRACH extraction and filtering.

Management Plane: refers to non-real-time management operations between the LLS-CU and the RU: Radio Unit: a logical node hosting Low-PHY layer and RF processing based on a lower layer functional split. This is similar to 3GPP's "TRP" or "LLS-DU" but more specific in including the Low-PHY layer (FFT/iFFT, PRACH extraction).

Synchronization Plane: refers to traffic between the RU or LLS-CU to a synchronization controller which is generally an IEEE-1588 Grand Master (however, Grand Master functionality may be embedded in the LLS-CU).

Slot: this is a group of 14 symbols, for LTE and NR. LTE has a separate slot definition within 3GPP which is 7 symbols but that definition is not used in this specification. So for NR, "slot" in this document means slot as 3GPP defines it, but for LTE "slot" in this document correlates to the LTE "TTI" as defined by 3GPP.

Spatial stream: the data flow on the DL associated with precoded data (may be same as layers or different if there is expansion in the precoding), and on UL associated with the number of outputs from the digital beamforming (sometimes called "beams).

Synchronization Status Message: part of ITU G.781 and G.8264 standards.

TRX: Refers to the specific processing chain in an RU associated with D/A or A/D converters. Due to digital beamforming the number of TRXs may exceed the number of spatial streams, and due to analog beamforming the number of TRXs may be lower than the number of antenna elements.

User Plane: refers to IQ sample data transferred between LLS-CU and RU UL:

UpLin: data flow away from the radiating antenna (generally on the LLS interface) XRB: xRAN Resource Block: for LTE this is the same as PRB (Physical Resource Block) but for NR this is the same as CRB (Common Resource Block). In NR there can be a dynamically variable offset between CRB and PRB while this specification wants to use a fixed offset (for operational consistency) which is the case for LTE's PRBs.

Citations for references from the above disclosure are provided below.

Reference [1]: 3GPP TR 23.724 V1.0.0 (2018-07), Technical Specification Group Services and System Aspects; Study on Cellular IoT support and evolution for the 5G System (Release 16); and Reference [2]: XRAN-FH.CUS.0-v02.00, published Jul. 27, 2018 on www.xran.org Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 14:
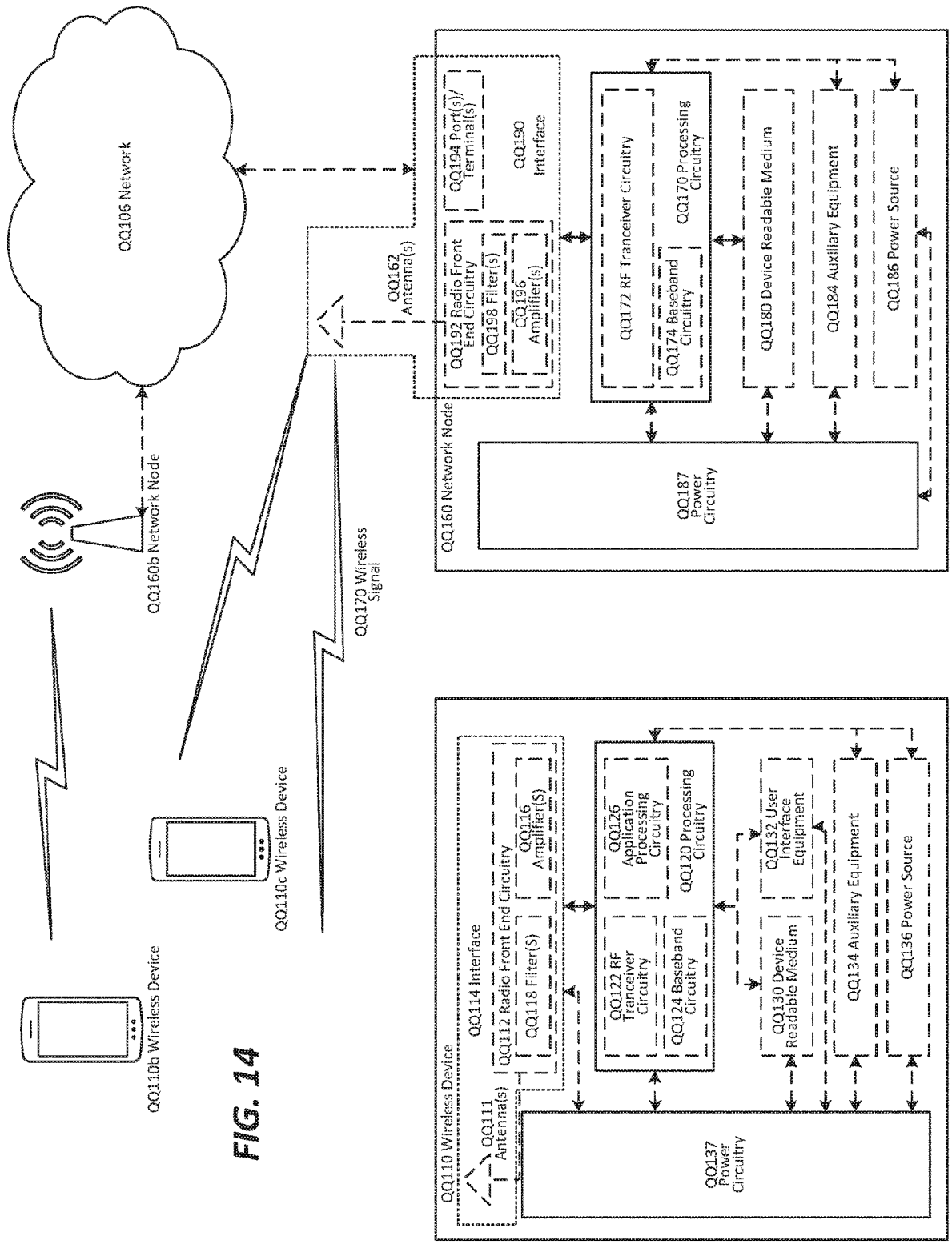
FIG. 14 is a block diagram of a wireless network in accordance with some embodiments.

FIG. 14: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio.

Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
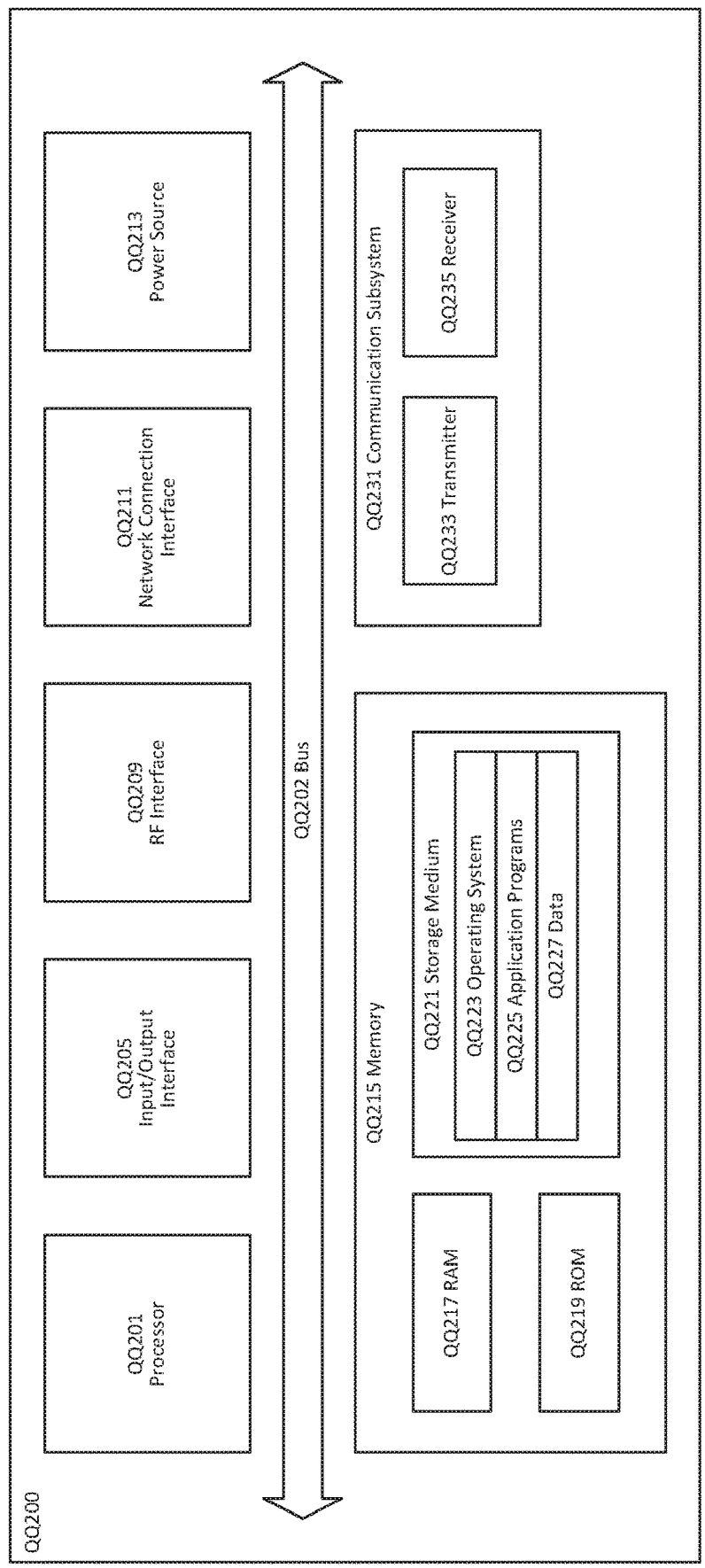
FIG. 15 is a block diagram of a user equipment in accordance with some embodiments

FIG. 15: User Equipment in accordance with some embodiments

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
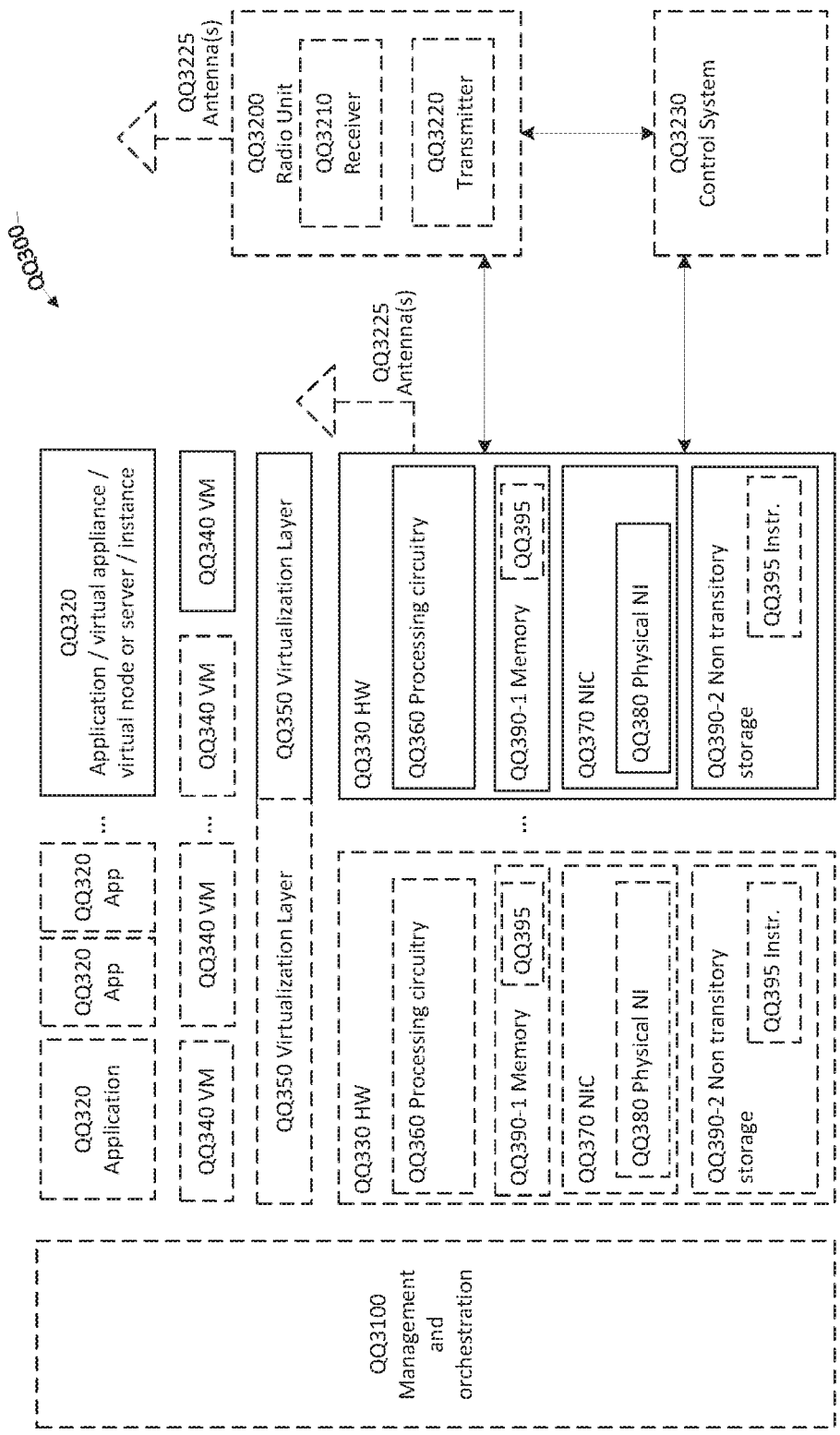
FIG. 16 is a block diagram of a virtualization environment in accordance with some embodiments.

FIG. 16: Virtualization environment in accordance with some embodiments

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
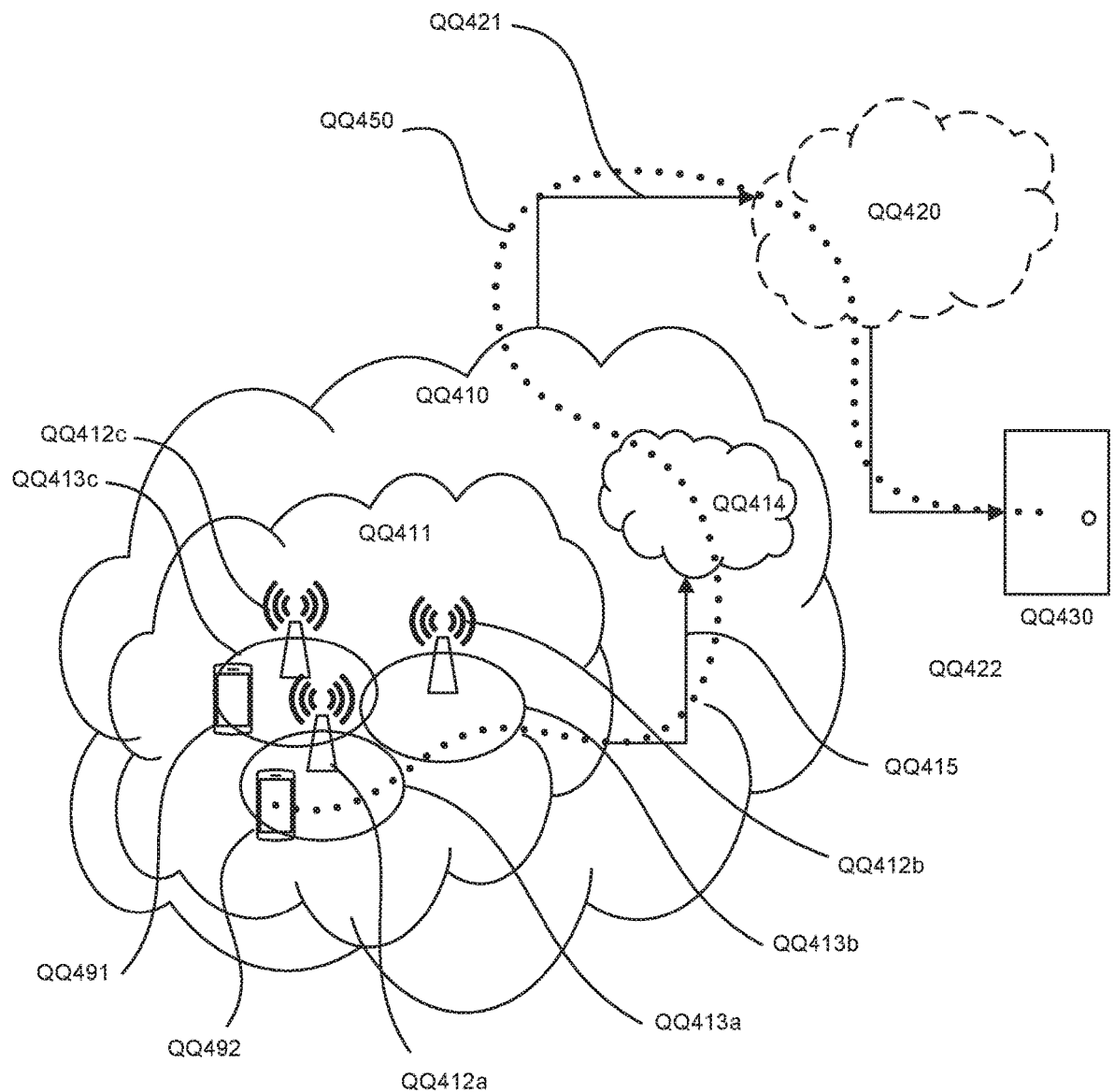
FIG. 17 is a block diagram of a telecommunication network connected via an intermediate network to a host computer in accordance with some embodiments.

FIG. 17: Telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
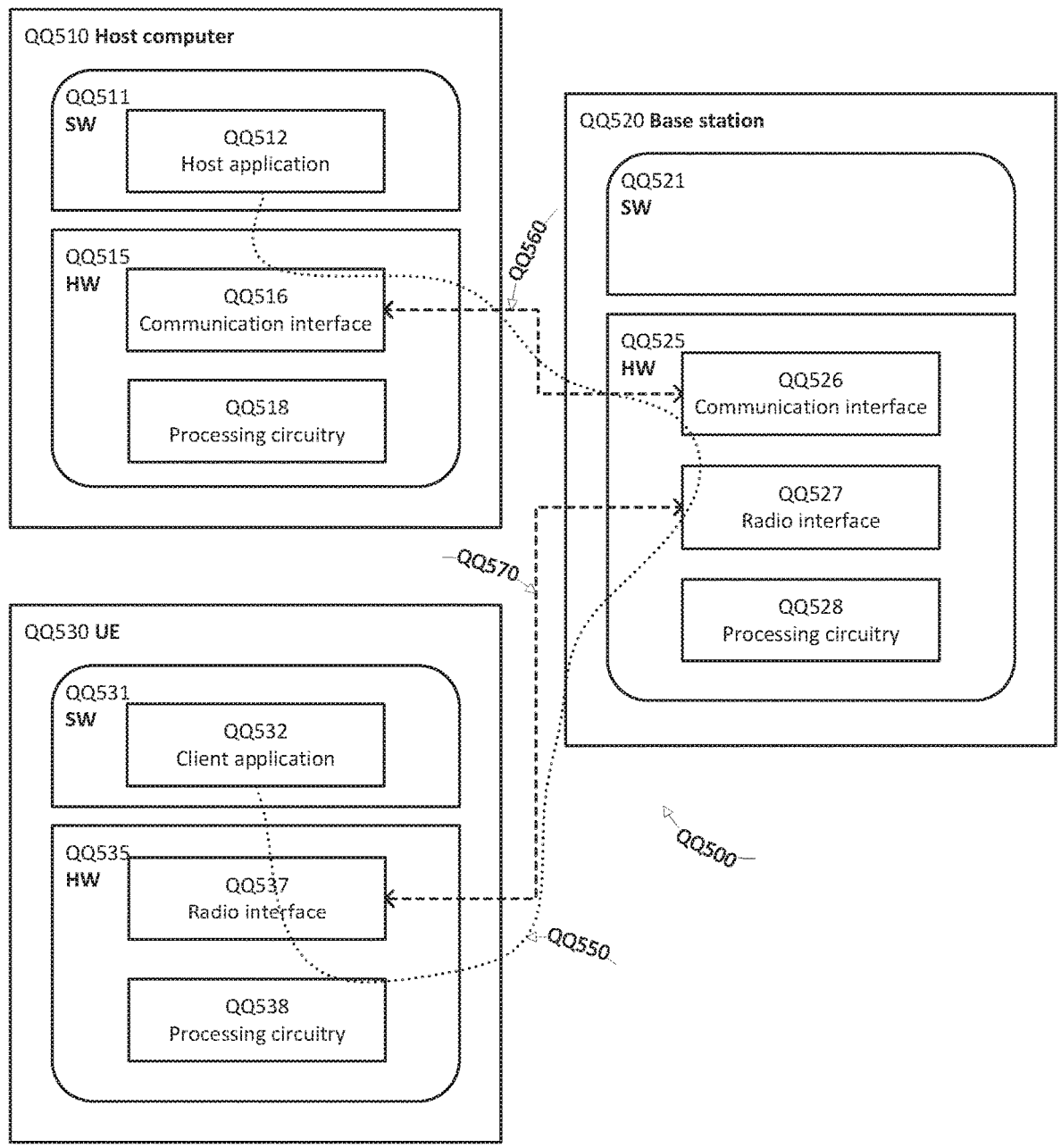
FIG. 18 is a block diagram of a host computer communicating via a base station with a user equipment over a partially wireless connection in accordance with some embodiments.

FIG. 18: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located.

Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
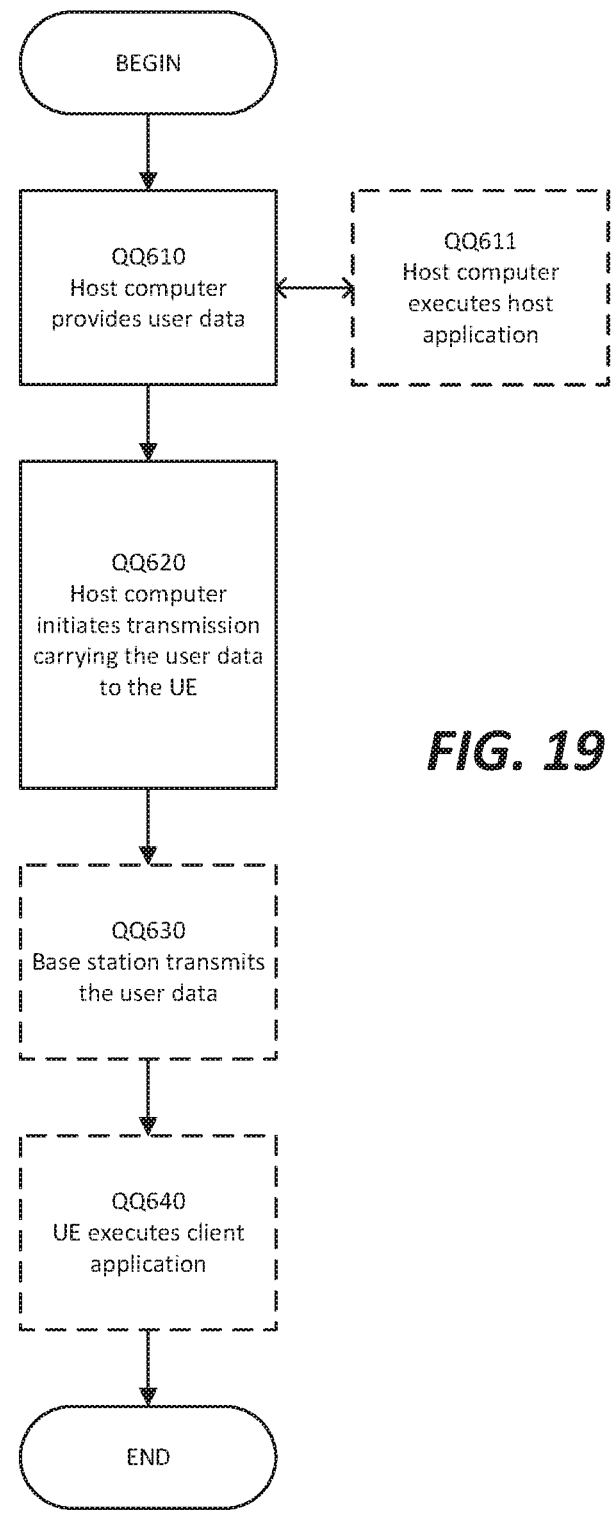
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
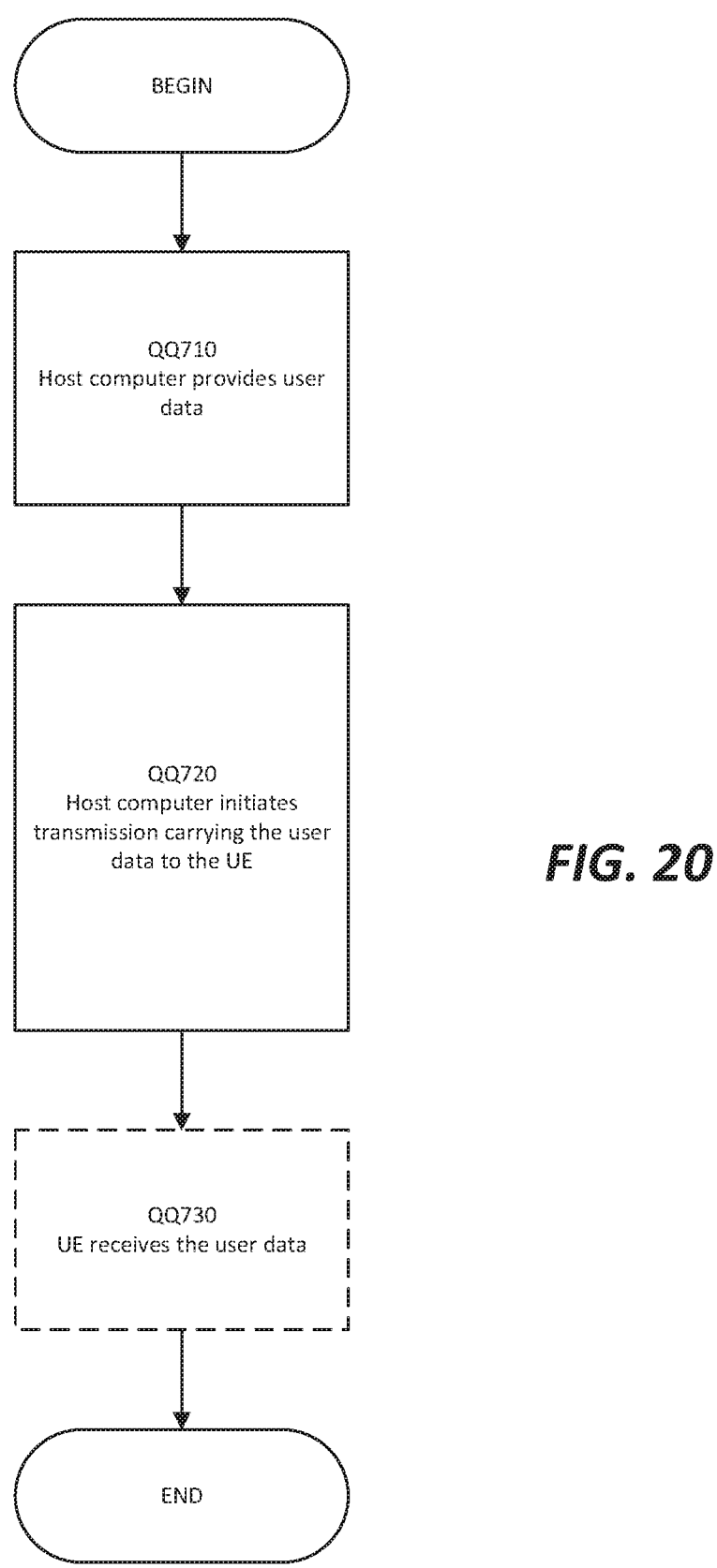
FIG. 20 is a block diagram of methods implemented in a communication system including a host computer, a base station, and a user equipment in accordance with some embodiments.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
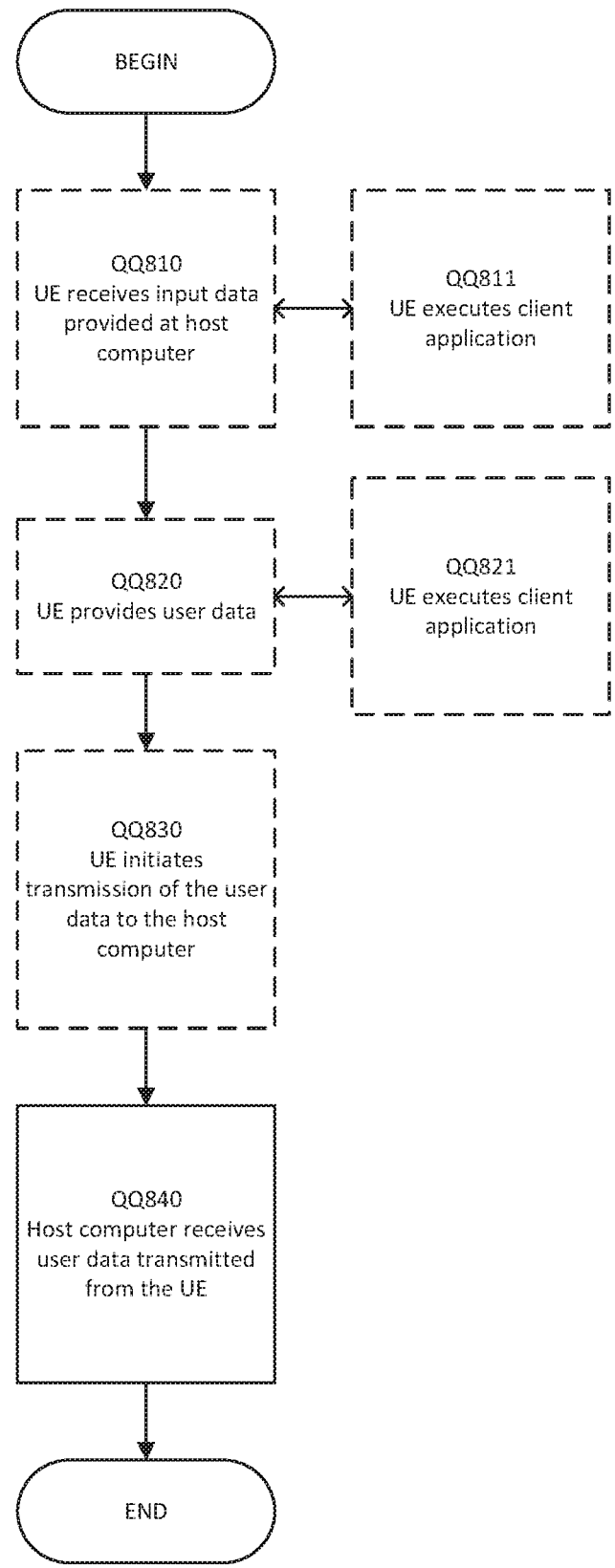
FIG. 21 is a block diagram of methods implemented in a communication system including a host computer, a base station, and a user equipment in accordance with some embodiments.

FIG. 21: Methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 22:
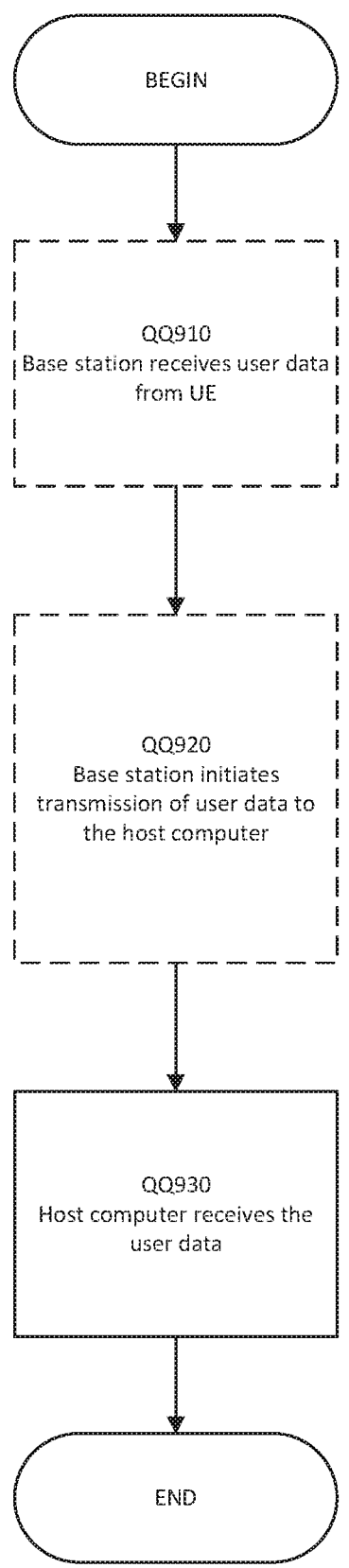
FIG. 22 is a block diagram of methods implemented in a communication system including a host computer, a base station, and a user equipment in accordance with some embodiments.

FIG. 22: Methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a lower-layer split central unit (LLS-CU) in a network node of a wireless communication system, comprising:
providing, at the LLS-CU, a plurality of downlink signals to be transmitted to a user equipment (UE) over a wireless radio interface;
allocating the plurality of downlink signals to a plurality of resource elements (REs) of a physical downlink channel of the wireless radio interface to be used for transmitting the plurality of downlink signals to the UE;
generating a data-associated control information (DACI) message including a section description associated with the plurality of downlink signals, the DACI message including a resource element mask that defines the location of one or more REs within a physical resource block (PRB) of a downlink signal on the physical downlink channel, and an indication of a plurality of sets of beamforming weights to be applied by a radio unit (RU) when transmitting the plurality of downlink signals to the UE, wherein sets of beamforming weights are associated with resource elements according to the resource element mask, wherein the indication of the plurality of sets of beamforming weights is carried in a section extension of the section description, wherein an indication of an individual set of beamforming weights for each position defined in the RE mask is provided;
transmitting the DACI message to the RU; and
transmitting the plurality of downlink signals to the RU for transmission to the UE.

2. The method of claim 1, wherein:
the plurality of downlink signals are assigned to a plurality of PRBs in a section associated with the section description; and
the RE mask defines positions of REs for all PRBs in the section.

3. The method of claim 2, further comprising:
providing an indication of a unique set of beamforming weights for each RE in the section at a location in a PRB corresponding to a position defined in the RE mask.

4. The method of claim 2, wherein the indication of a set of beamforming weights applies to each RE at a location in a PRB corresponding to a position defined in the RE mask.

5. The method of claim 1, wherein the indication of the plurality of sets of beamforming weights comprises the plurality of sets of beamforming weights.

6. The method of claim 1, wherein the indication of the plurality of sets of beamforming weights comprises a plurality of beam indices, each of the beam indices corresponding to one of the plurality of sets of beamforming weights.

7. The method of claim 1, wherein the indication of the plurality of sets of beamforming weights comprises a plurality of sets of beamforming attributes that describe respective antenna beams.

8. The method of claim 1, wherein the section description comprises a plurality of section extensions, wherein each section extension of the plurality of section extensions identifies one of the plurality of sets of beamforming weights.

9. The method of claim 1, wherein the indication of the plurality of sets of beamforming weights comprises a first set of complete beamforming weights and at least one set of delta-coded beamforming weights that are delta-coded with respect to the first set of complete beamforming weights.

10. A method of operating a radio unit (RU) in a network node of a wireless communication system, comprising:
receiving, from a lower-layer split central unit (LLS-CU), a data-associated control information (DACI) message including a section description associated with a plurality of signals, the DACI message including a resource element mask and an indication of a plurality of sets of beamforming weights to be applied by the RU when transmitting the plurality of signals to, or receiving the plurality of signals from, a user equipment (UE) wherein sets of beamforming weights are associated with resource elements (REs) according to the resource element mask, wherein the indication of the plurality of sets of beamforming weights is carried in a section extension of the section description, wherein an indication of an individual set of beamforming weights for each position defined in the RE mask is provided; and transmitting the plurality of signals to or receiving the plurality of signals from, the UE using the plurality of sets of beamforming weights.

11. The method of claim 10, wherein the indication of the plurality of sets of beamforming weights comprises an indication of which of the plurality of sets of beamforming weights is to be applied to each of the plurality of REs used to transmit or receive the plurality of signals.

12. The method of claim 10, wherein the indication of the plurality of sets of beamforming weights comprises the plurality of sets of beamforming weights.

13. The method of claim 10, wherein the indication of the plurality of sets of beamforming weights comprises a plurality of sets of beamforming attributes that describe respective antenna beams.

14. The method of claim 10, wherein the section description comprises a plurality of section extensions, wherein each section extension of the plurality of section extensions identifies one of the plurality of sets of beamforming weights.

15. The method of claim 10, wherein the indication of the plurality of sets of beamforming weights comprises a first set of complete beamforming weights and at least one set of delta-coded beamforming weights that are delta-coded with respect to the first set of complete beamforming weights.

16. A method of operating a lower-layer split central unit-(LLS-CU) in a network node of a wireless communication system, comprising:

assigning a plurality of uplink signals to a plurality of resource elements (REs) of a physical uplink channel of the wireless radio interface to be used for receiving the plurality of uplink signals from a user equipment (UE);

generating a data-associated control information (DACI) message including a section description associated with the plurality of uplink signals, the DACI message including a resource element mask that defines the location of one or more REs within a physical resource block (PRB) of an uplink signal on the physical uplink channel, and an indication of a plurality of sets of beamforming weights to be applied by a radio unit (RU) when receiving the plurality of uplink signals from the UE, wherein sets of beamforming weights are associated with resource elements according to the resource element mask, wherein the indication of the plurality of sets of beamforming weights is carried in a section extension of the section description, wherein an indication of an individual set of beamforming weights for each position defined in the RE mask is provided; and transmitting the DACI message to the RU.

* * * * *